United States Patent
Taylor et al.

(10) Patent No.: US 7,255,551 B2
(45) Date of Patent: Aug. 14, 2007

(54) HIGH VOLUME PRINT-FORMING SYSTEM

(75) Inventors: Charles S. Taylor, Stockton, NJ (US); Paul Cherkas, San Jose, CA (US); Robert A. Geshlider, San Francisco, CA (US); Dwight P. Morejohn, Davis, CA (US); Sue W. Vican, San Francisco, CA (US); Bhupendra O. Shah, Cupertino, CA (US); Eric Reeser, Fremont, CA (US)

(73) Assignee: Eoplex Technologies, Inc., Redwood City, CA (US)

( * ) Notice: Subject to any disclaimer, the term of this patent is extended or adjusted under 35 U.S.C. 154(b) by 120 days.

(21) Appl. No.: 10/754,795

(22) Filed: Jan. 8, 2004

(65) Prior Publication Data

US 2004/0170459 A1    Sep. 2, 2004

Related U.S. Application Data

(60) Provisional application No. 60/438,514, filed on Jan. 8, 2003.

(51) Int. Cl.
*B05C 5/00* (2006.01)
*B28B 5/00* (2006.01)
*B28B 1/32* (2006.01)
*B28B 17/00* (2006.01)

(52) U.S. Cl. ............... 425/253; 425/112; 264/410; 264/308

(58) Field of Classification Search .......... 264/401, 264/308, 410; 425/325, 447, 112, 253
See application file for complete search history.

(56) References Cited

U.S. PATENT DOCUMENTS 3,656,634 A * 4/1972 Pearne et al. ............. 414/788.5
3,763,776 A * 10/1973 Jaffa ........................ 101/126
3,861,955 A * 1/1975 Lemelson .................. 427/131
4,068,766 A * 1/1978 Schmitt ..................... 414/791
4,466,994 A * 8/1984 Hubbard et al. ........... 427/542
4,824,306 A * 4/1989 Stevenson ............... 414/788.4
5,157,438 A * 10/1992 Beale ......................... 355/72
5,260,009 A * 11/1993 Penn ......................... 264/401
5,286,573 A   2/1994 Prinz
5,348,693 A * 9/1994 Taylor et al. .............. 264/401
5,354,414 A   10/1994 Feygin
5,540,545 A * 7/1996 Roberts et al. .......... 414/792.6
6,821,473 B2 * 11/2004 Hiizumi et al. ............ 264/401

* cited by examiner

*Primary Examiner*—Christina Johnson
*Assistant Examiner*—Matthew J. Daniels
(74) *Attorney, Agent, or Firm*—Heisler & Associates

(57) ABSTRACT

A system is provided for high volume print-forming of structures made up of multiple separate layers. A support bed is provided which has multiple steps arrayed thereon at different heights. Substrate blocks rest upon each of the steps. A printing process is utilized to print material from which the structures are to be formed down onto the substrate blocks. This printing process prints different layers onto each of the substrate blocks. The substrate blocks then move to a different step on the support bed and the printing process is repeated. Each support block has a partial structure thereon which receives its next successive layer in each printing cycle until the partial structure becomes a completed structure by having each of its layers sequentially printed thereon. Subsystems are provided for moving the substrate blocks upon the support bed and for properly holding and aligning substrate blocks upon the support bed.

53 Claims, 16 Drawing Sheets

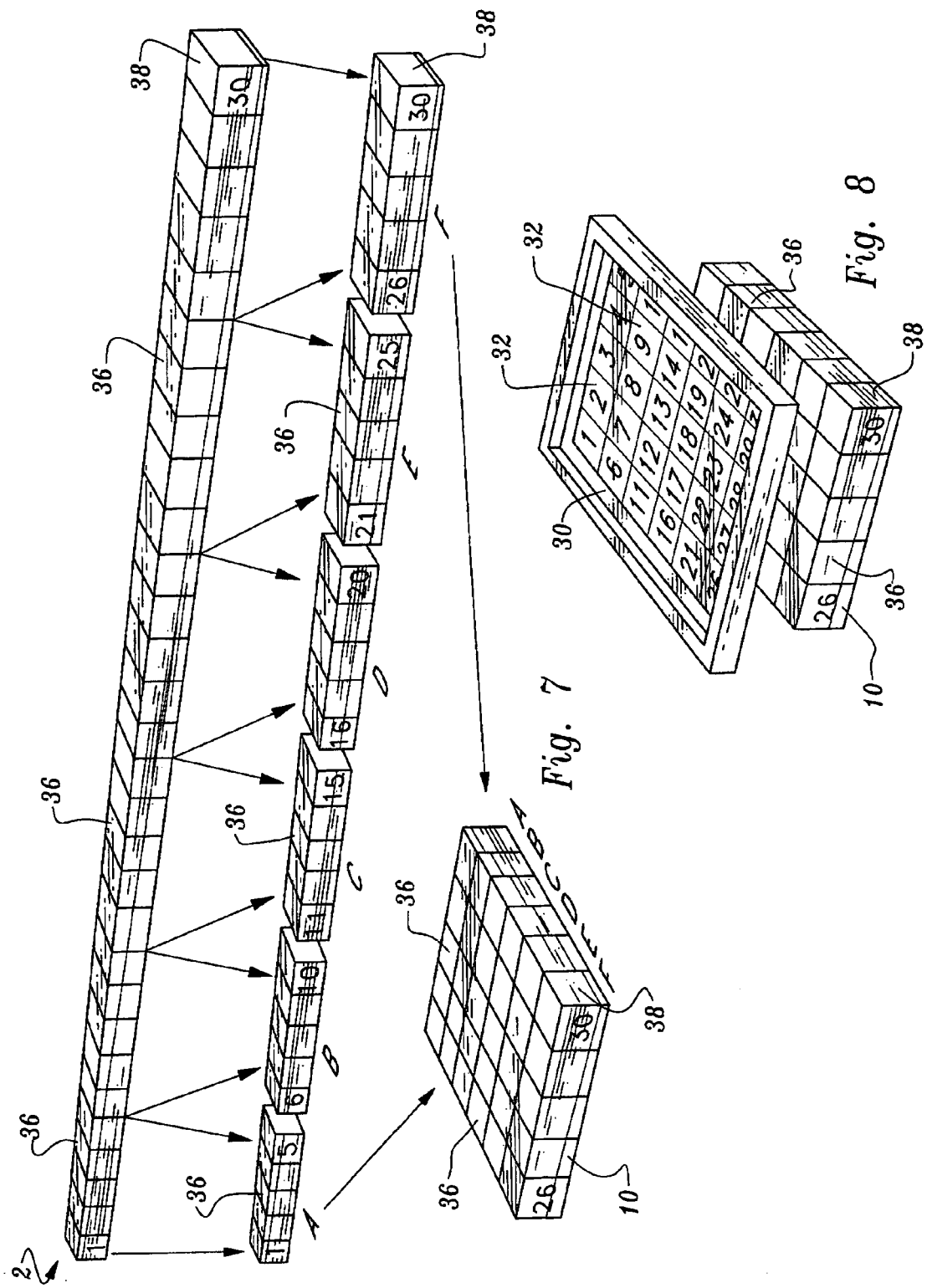

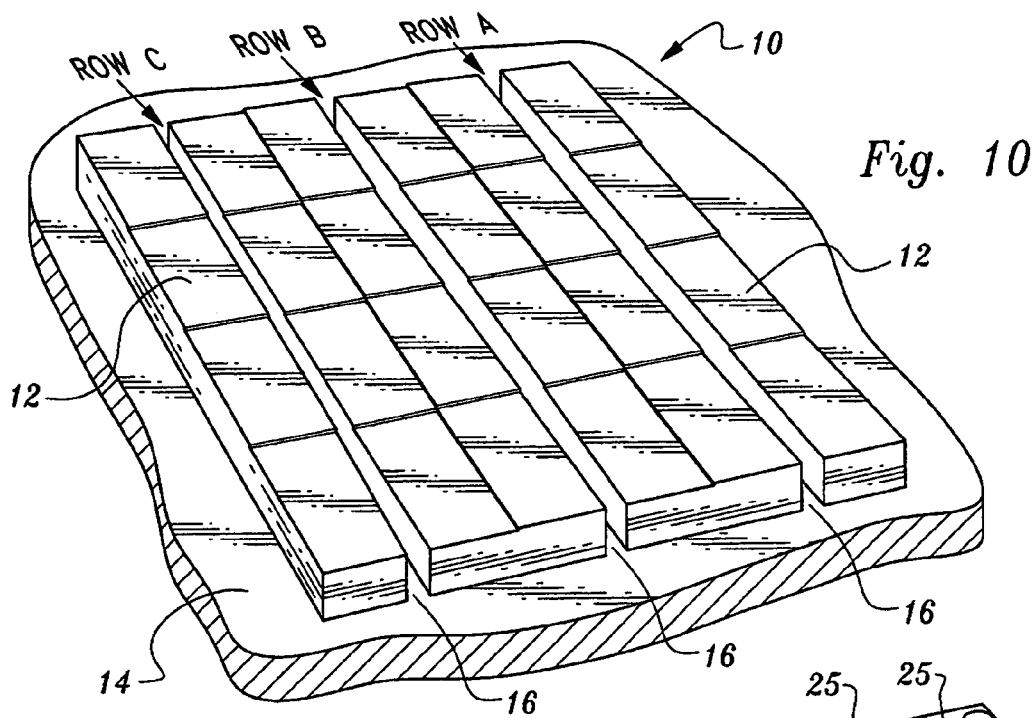
Fig. 10
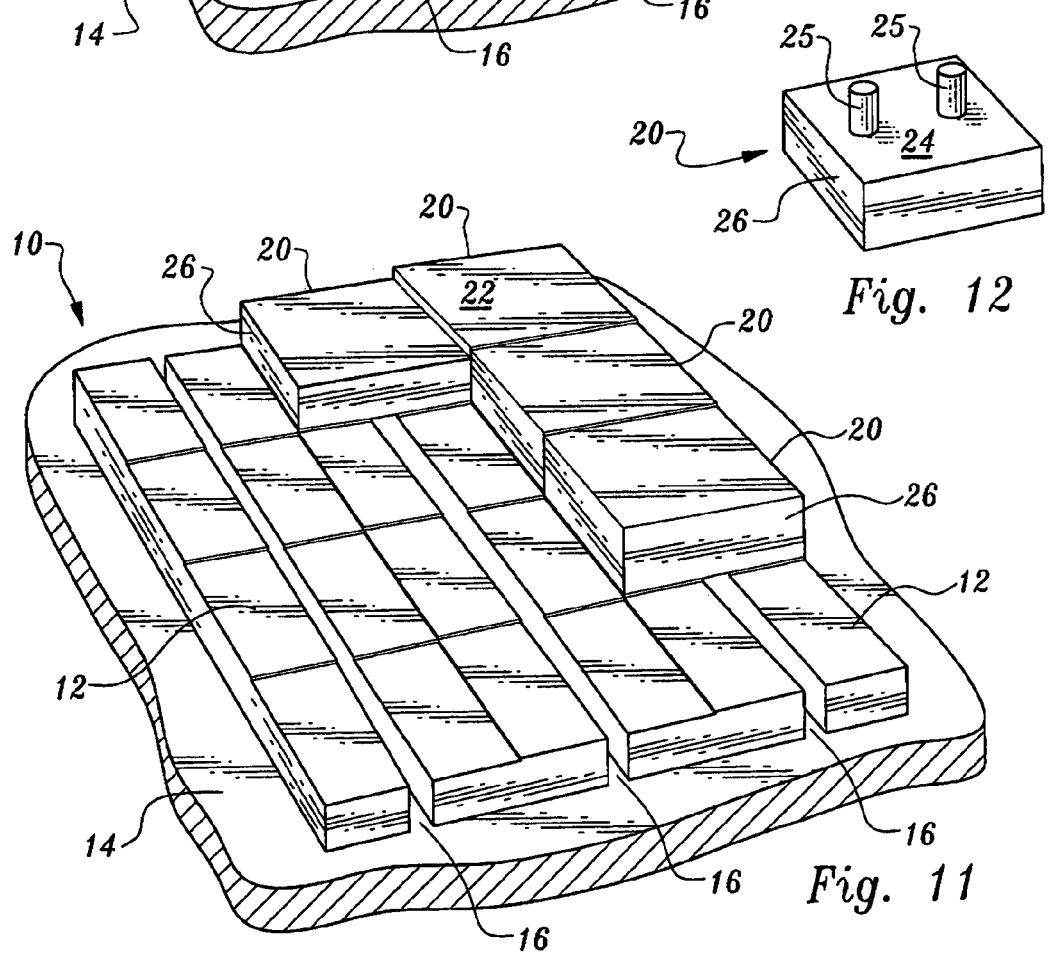
Fig. 12
Fig. 11

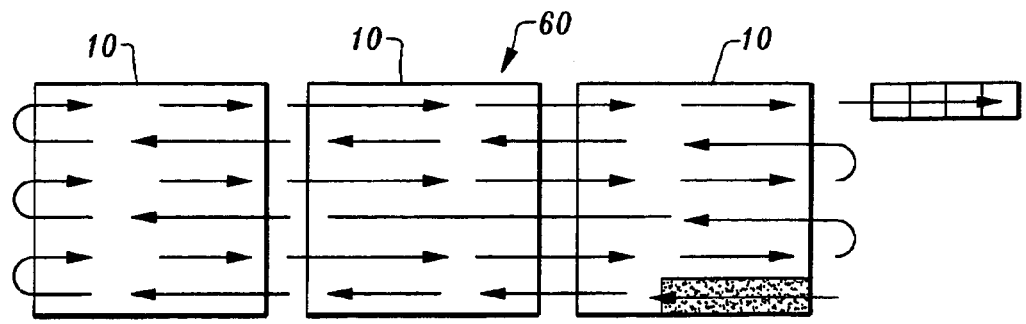
Fig. 21
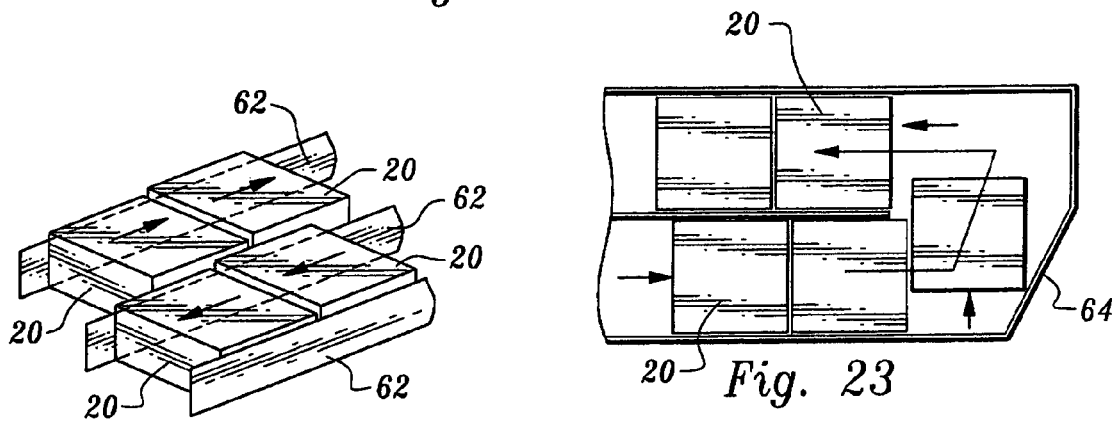
Fig. 22
Fig. 23
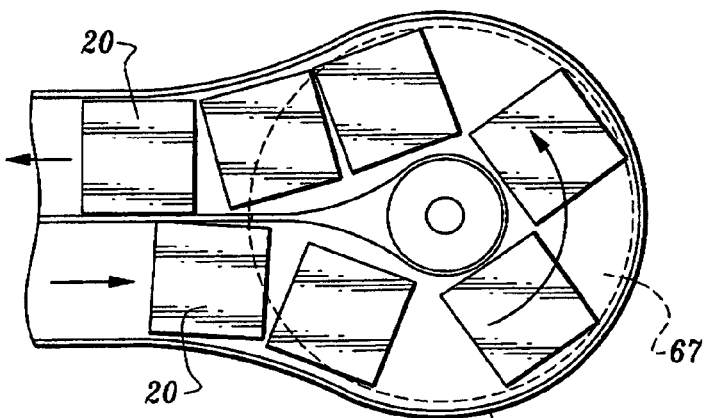
Fig. 24
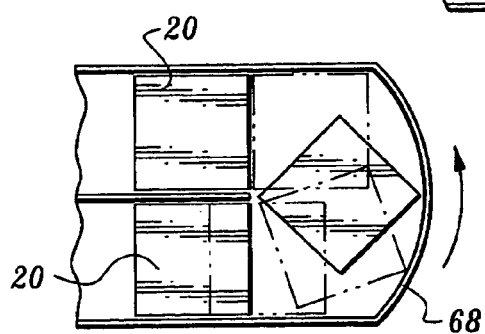
Fig. 25

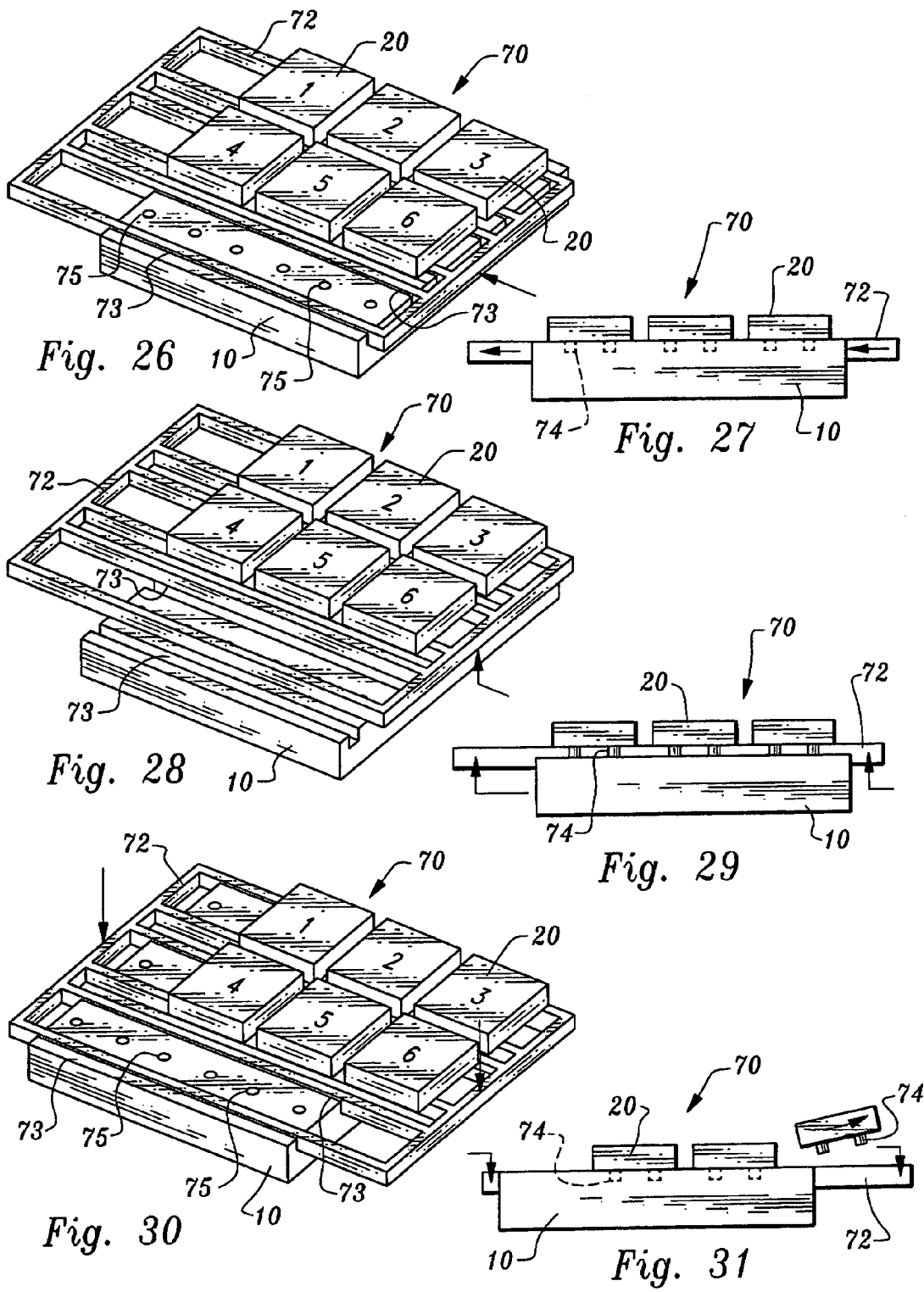

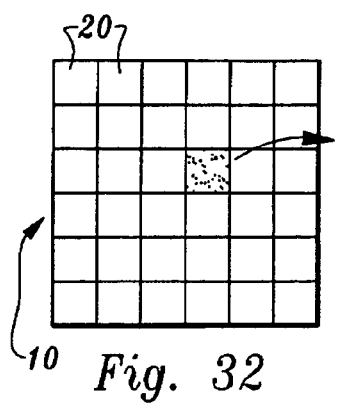
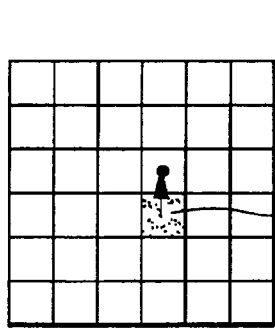
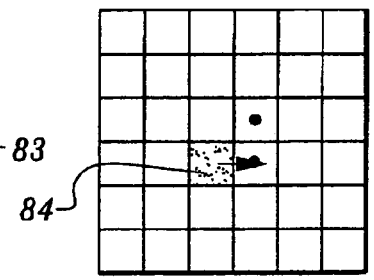
Fig. 32   Fig. 33   Fig. 34
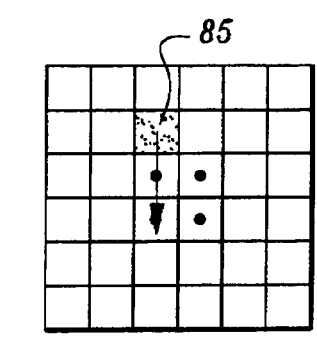
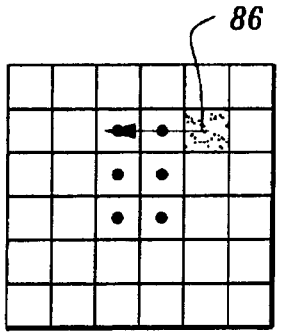
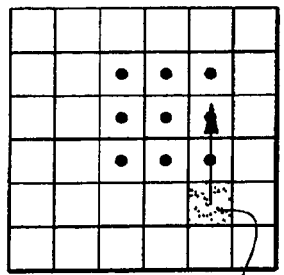
Fig. 35   Fig. 36   Fig. 37
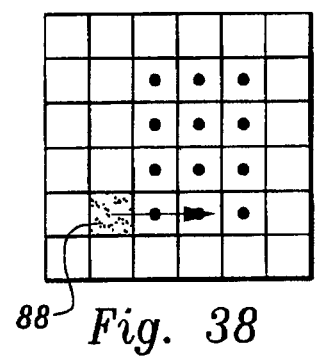
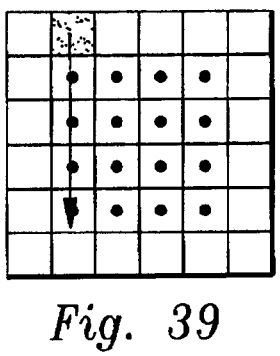
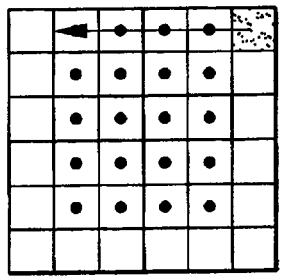
Fig. 38   Fig. 39   Fig. 40
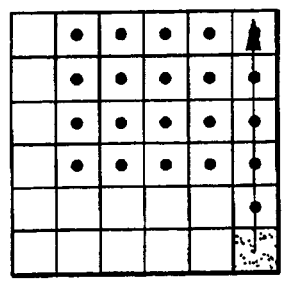
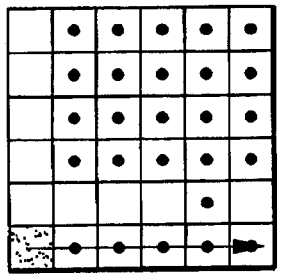
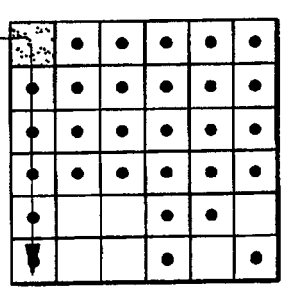
Fig. 41   Fig. 42   Fig. 43

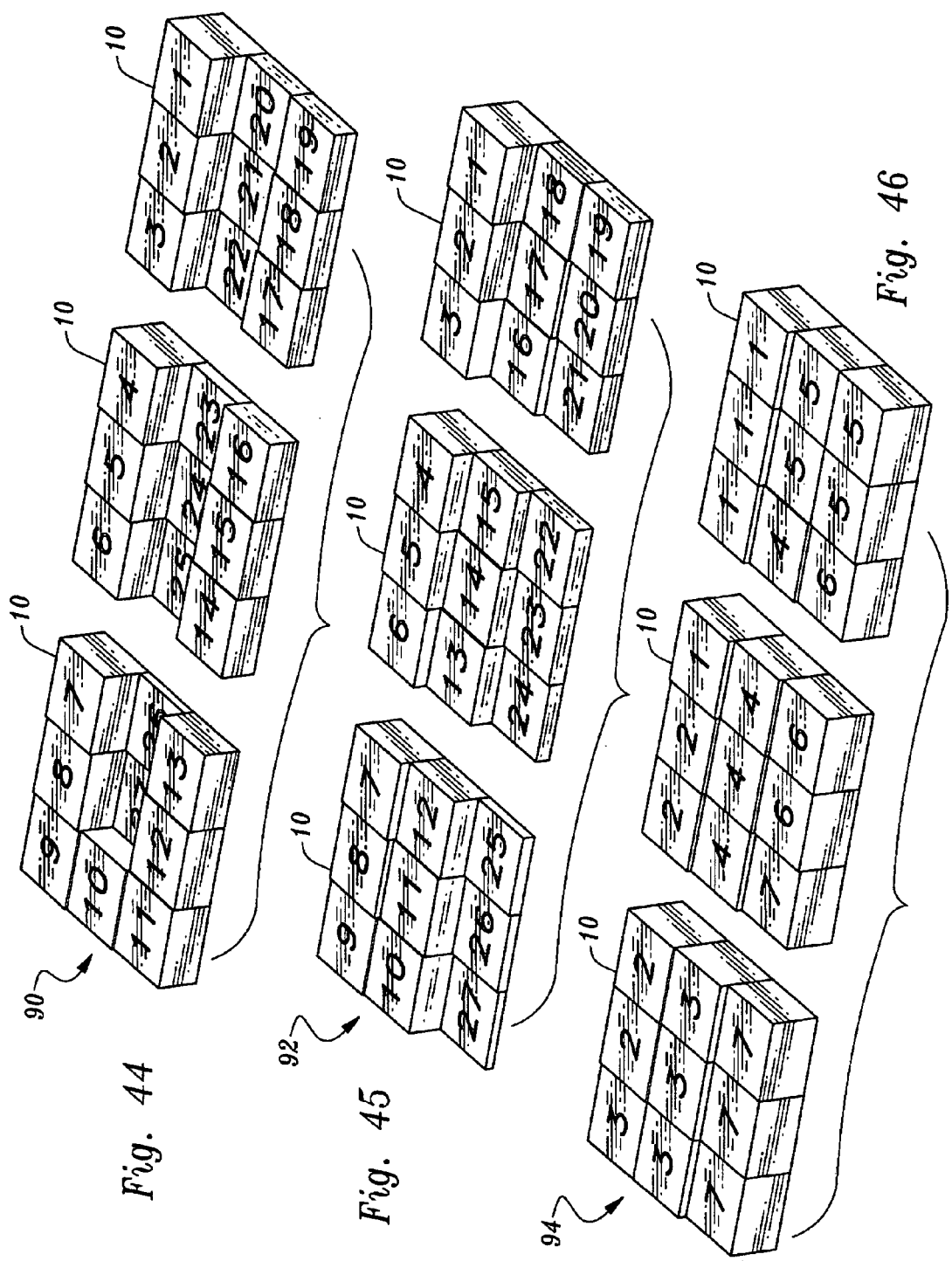

HIGH VOLUME PRINT-FORMING SYSTEM

CROSS-REFERENCE TO RELATED APPLICATIONS

This application claims benefit under Title 35, United States Code § 119(e) of U.S. Provisional Application No. 60/438,514 filed on Jan. 8, 2003.

This application incorporates herein by reference the entire contents of U.S. Pat. No. 5,348,693.

FIELD OF THE INVENTION

The following invention relates to methods and apparatuses for manufacturing structures which can be defined as a series of stacked slices of a printable material. More particularly, this invention relates to high volume systems for print-forming structures by sequentially printing separate layers of the structures at multiple different locations simultaneously and then moving the partially formed structures to a new location for further printing until the structures have been completed.

BACKGROUND OF THE INVENTION

The HVPF™ (High Volume Print-Forming) process of this invention is a new and unique manufacturing process with advantages in many applications and industries. This manufacturing process allows low cost production of small, complex structures or assemblies and co-fired ceramic circuits. A market exists for such structures with optimized designs not profitably manufacturable with current technologies that require the HVPF™ manufacturing process methods and devices. Included in these specialized devices presently described is the enabling support bed invention also referred to by the trademark "Ziggurat," and associated substrate blocks also referred to by the trademark "Ziggys." As will be described, the "Ziggurat" is a new species of a previously patented "Progressive Wedge" concept identified in U.S. Pat. No. 5,348,693, incorporated herein by reference.

HVPF™ manufacturing processes are 3-D (three-dimensional) print-forming methods that can produce structures or assemblies from virtually any material that can be printed, bonded or sintered, including ceramic, glass, metal or polymer, and combinations of these materials, at high speed and low cost. It is not a rapid prototyping process and has few of the limitations of rapid prototyping. Structures can be produced from multiple materials and specific engineered parts can be designed into complex functional geometries including mechanical structures with moving parts and "preassembled" components built in-situ. HVPF™ enables the manufacture of complex geometric structures without increasing manufacturing costs and it provides freedom from many typical manufacturing constraints, allowing form to more closely follow function.

HVPF™ processes capitalize on advances in a number of technologies, including printing, ceramic and metal injection molding, CAD/CAM, advanced materials, robotics, sensors and imaging. The printing portion of HVPF™ process is similar to "two-dimensional" printing including screen printing, flexo, gravure or offset lithography. HVPF™ differs in that subsequent prints are layered on top of each other, like the pages of a book, to print-form a three dimensional object, which is made entirely of the printed material. Different layers may contain different shapes, creating three-dimensional geometry when multiple layers are combined together, as shown in FIG. 1. Further detail on the background of high volume print-forming by the known progressive wedge technique can be found by reference to U.S. Pat. No. 5,348,693.

In its simplest form, the progressive wedge is physically a linear array of advancing unfinished structures, which are successively built from first to last, layer-by-layer, from the bottom-most layer upward. Only the last structure is complete as it receives the last layer. Every structure in the linear array receives the next layer on top of the previous layers at the same time as all the other structures, each structure getting the layer specifically required at its height at that time in the build sequence. With every cycle, the "oldest" structure comes off the end of the line finished, and one new structure is started at the beginning. The same printer image is printed every time, which consists of a linear array of cross section images of the structure. As noted before, there may be two or more materials used for each layer printed, and the structures only advance after all materials for that layer have been printed.

With structures that have many layers and relatively large dimensions, this progressive wedge and its associated printing machinery often would be, out of necessity, a proportionally long physical structure. The printer, with its repetitive print cycles, works with the progressive wedge as a printing platen, a means to reassemble a computer-generated structure that has been horizontally sliced into many thin, printable layers, into a real print-formed structure. As illustrated in FIG. 2, the cyclical action of the screen would print all the different and successive layers onto the forming structures below, all at the same time, over and over again. Between every print cycle, the structures move along the progressive wedge one step left to right.

The "progressive" aspect of the progressive wedge refers to the fact that the structures being built move or "progress" one place between every printing cycle as well as grow "progressively" in thickness with every printing cycle. Therefore, a structure starts out at one end of the progressive wedge by its first layer being printed onto a flat formation site. The partial structure then receives the second layer on top of the first and so on until it finishes at the other end with the last layer being printed on top of all the previous layers. This would be analogous to a waiter collecting plates, each of a different shape than the last, and stacking them on top of each other until there is a tall stack. The individual plates represent the print cycles; the stack represents the full structure.

The "wedge" aspect of the progressive wedge is specifically regarding the growing height of the individual structures as they move relative to the image being printed. The collective shape of the structures in progress forms a wedge in side view, with the thin end of the wedge at the beginning of the printing line and the thick end at the "finished structures" end. Being that the top surface of the wedge must remain level and parallel with the printing plane, the bottom surface of the structures must be progressively lowered one layer thickness at a time, as they advance. Using the plate analogy again, imagine the stack of plates in an automatic plate dispenser that keeps the top plate level with the serving table by adjusting the height of the bottom plate in the stack.

SUMMARY OF THE INVENTION

The embodiment of the support bed or "Ziggurat" described herein is a species of HVPF™ based on screen-printing technology. For clarity, descriptions will be based on this technology, without excluding other printing methods usable with the machines, methods and apparatuses disclosed herein.

A screen printer machine pushes an ink with a squeegee-like device through a fine screen with an exact pattern of open spaces to create a layer of ink of the same pattern onto a flat surface just below the screen. The screen acts as a stencil or template for the ink. The "inks" used in this process include mixtures of ceramic and metal powders, polymers and binders, often in a paste form. These inks are used in particular combinations or alone to print structures that have specific materials incorporated exactly where they are needed in each structure.

Each layer of the structure being print-formed is preferably comprised of at least two materials when that layer is finished being printed. One material, or ink, is the material that makes up that particular cross-section of the structure being print-formed on that layer. This structure, on any given layer, may be composed of one or more materials, dependent on design, and these materials that compose the structure are called "positive inks." Another material, called "negative ink" is typically printed around the cross-section of the structure itself on the same layer. This negative ink forms a temporary support around the positive ink. It is also referred to as "sacrificial material" as it is typically removed or sacrificed later to expose the final structure.

A different screen is used to print each of the different positive inks as well as the negative ink, as each has its specific shape to fill on that particular layer. The negative ink has several functions, including support of positive ink on the same layer, support of positive ink on the layer above and below, as the positive shapes often change on adjacent layers, and to maintain a level and complete printing surface on the whole area being printed, as shown in FIGS. 2 and 3.

What results in the system of this invention is a high volume print-forming arrangement including: a bed having a plurality of steps, at least two of the steps positioned at different heights relative to each other, a plurality of substrate blocks, each substrate block including a substantially planar upper surface and adapted to be positioned on one of the steps of the bed and to move between the steps while supporting upon the upper surface a structure being print formed, and a printer located above the upper surfaces of the substrate blocks and adapted to print material down toward the substrate blocks and upon the structures being print formed upon the substrate blocks.

After each printing step the substrate blocks move down one step and the printing process is repeated. Eventually, the layers being printed produce the completed structure. The negative material is then removed and the structure is complete or can be further treated as necessary.

OBJECTS OF THE INVENTION

Accordingly, a primary object of the present invention is to provide a method for printing high volumes of identical structures by printing layers of the structure one layer at a time and shifting the partially completed structures between printing locations, before repeating the printing process to add further layers to the partially completed structures until fully completed structures result.

Another object of the present invention is to provide a method for rapidly manufacturing large numbers of identical structures, particularly structures having complex geometries.

Another object of the present invention is to provide an apparatus for manufacturing large numbers of structures by sequentially printing layers of the structures with material from which the structure is to be formed.

Another object of the present invention is to provide a high volume print-forming method and apparatus which has a relatively large number of distinct printing locations and which has printing locations arrayed in two dimensions to minimize an overall length of the region where the printing occurs.

Another object of the present invention is to provide a high volume print-forming method and apparatus which can precisely form high volumes of structures to exacting tolerances in a rapid low cost fashion.

Other further objects of the present invention will become apparent from a careful reading of the included drawing figures, the claims and detailed description of the invention.

BRIEF DESCRIPTION OF THE DRAWINGS

FIG. 7 is a perspective view illustrating in general how a progressive wedge type of high volume print-forming is modified to provide high volume print-forming upon a support bed having lesser length.

FIG. 8 is a perspective view illustrating how a screen can be used for screen printing on the high volume print-forming structure shown in FIG. 7.

FIG. 10 is a perspective view of the support bed for use according to one form of this invention.

FIG. 11 is a perspective view similar to that which is shown in FIG. 10 but with substrate blocks shown resting upon the steps of the support bed according to one form of this invention.

FIG. 12 is a perspective view of a lower surface of one of the substrate blocks shown in FIG. 11.

FIGS. 15-18 are sequential schematic views further illustrating a preferred form of shuffling pattern according to this invention.

FIG. 21 is a schematic view of a first alternative shuffling pattern for moving the substrate blocks upon the support bed according to this invention.

FIG. 22 is a perspective view of a portion of that which is shown in FIG. 21 and illustrating how ribbons can be used to allow substrate blocks to effectively pass adjacent each other.

FIGS. 23-25 provide top plan views of portions of the first alternative shuffling pattern of FIG. 21 and illustrating how substrate blocks can transition between rows at the end columns upon the support bed.

FIGS. 26-31 include perspective views and front elevation views of an alternative shuffling tool for moving the substrate blocks upon the support bed.

FIGS. 32-43 provide schematic views of a second alternative shuffling pattern for moving the substrate blocks upon the support bed.

FIGS. 44-46 are perspective views of various alternative shuffling patterns for moving the substrate blocks upon the support bed according to this invention.

DESCRIPTION OF THE PREFERRED EMBODIMENT

Figure 1:
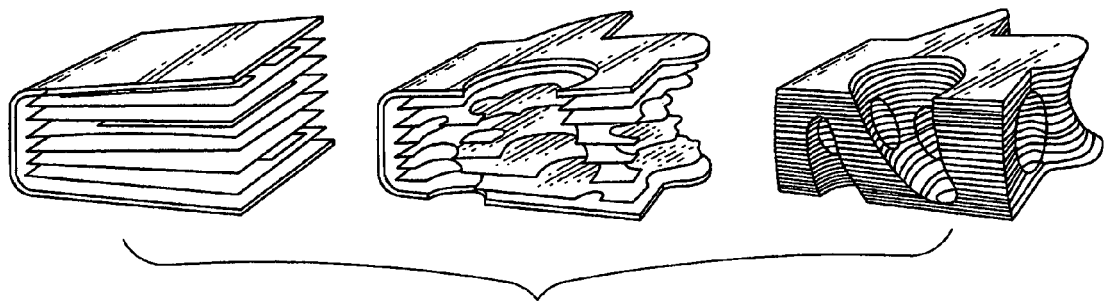
FIG. 1 is a perspective view illustrating the general concept of print-forming.
Figure 2:
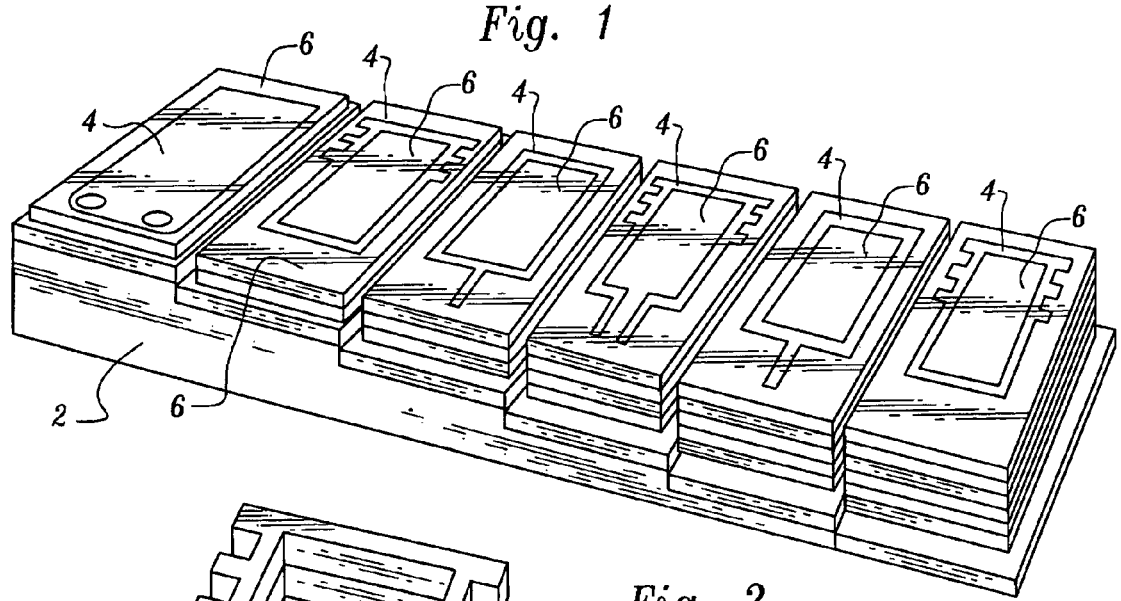
FIG. 2 is a perspective view of a progressive wedge species of high volume print-forming.
Figure 3:
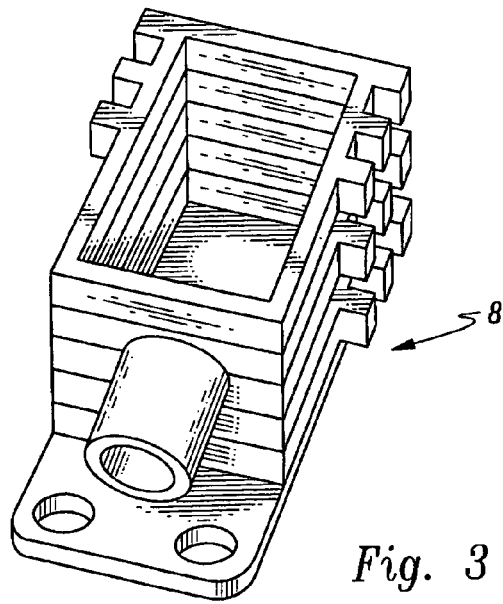
FIG. 3 is a perspective view of a completed structure such as would be formed by the high volume print-forming occurring as shown in FIG. 2.
Figure 4:
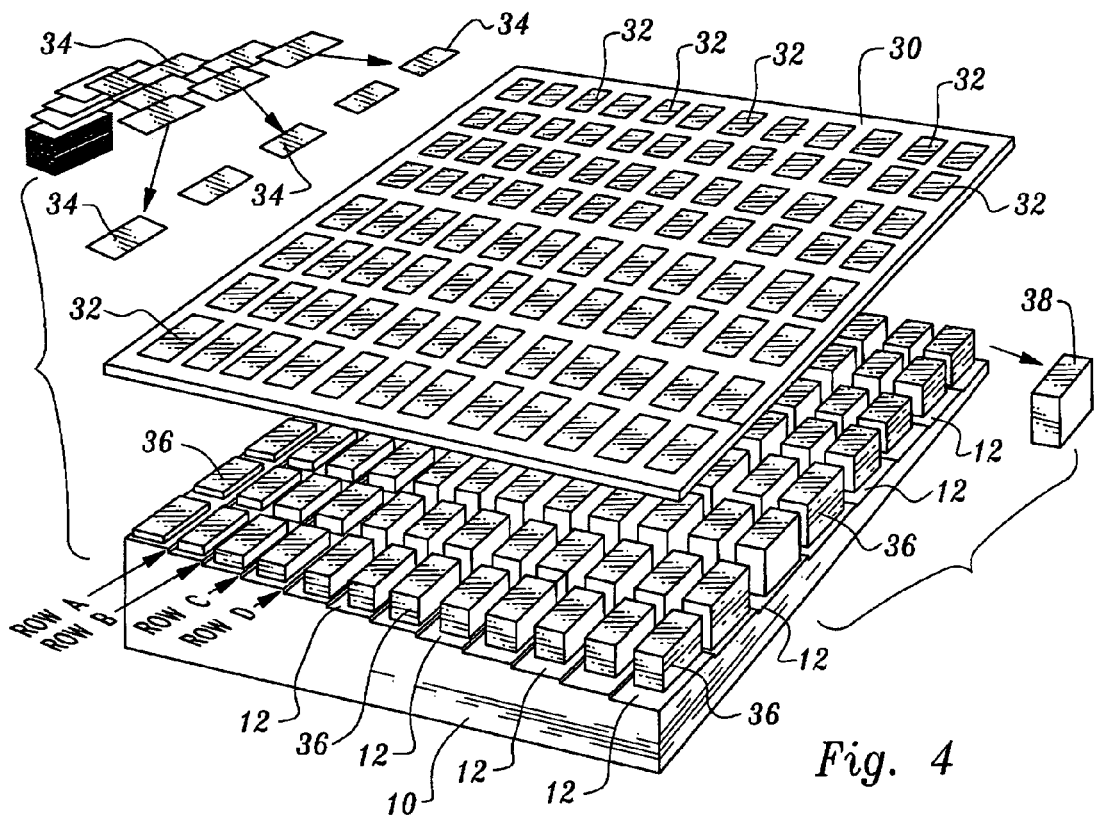
FIG. 4 is a perspective view of the high volume print-forming system of this invention illustrating the position of the support bed and partially completed structures relative to a screen provided for print-forming the structures.

Practically any shape that is computer modeled or is from a scanned source can be print-formed. The high volume print-forming HVPF™ process "slices" each complex shape into many sequential distinct cross-sections in a computer model. Each of these slices 34 (FIG. 4) is the thickness of a printed layer. The system then prints all the different cross-sections of a structure at the same time in adjacent spaces. As a result, many identical structures are being built at once, but each structure is in its own stage of construction. For example, a shape might be sliced into ninety-six cross-sections. In this example (FIG. 4), cross-sections one to ninety-six would be printed all at once but each cross-section would go into the correct location in ninety-six separate structures. With each cycle of the press screen 30, a completed structure 38 would come off the press, a new structure would be started, and all cross-sections from one to ninety-six would be printed again. In other words, with the technology, ninety-six structures are "works in progress" all at once, as shown in FIG. 4.

Figure 5:
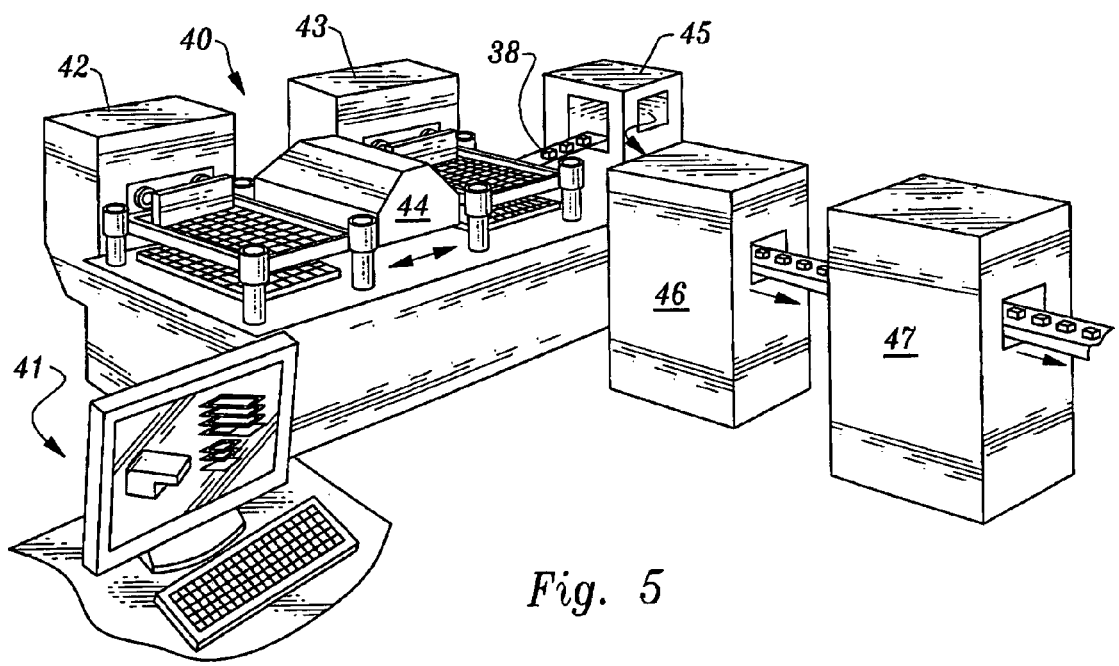
FIG. 5 is a schematic illustrating how various components of this invention work together according to the method of this invention.

Between printing cycles of printing station 40 (FIG. 5), including the positive printer 42 and the negative printer 43, the ink layers are typically quickly cured at a cure station 44, finally creating "green structures"; structures that need further processing to be finished. The cure station need not be a separate location, but could be built into the printers 42, 43 or otherwise provided as a means to cure the layers of material being applied. The as-printed "green" completed structures are then processed 45 to remove the supporting negative material. Additionally, structures made from metals and/or ceramics generally require a debinderizing 46 and sintering 47 process, much the same as in metal or ceramic injection molding. Polymers and ceramic and metal-filled polymers are cured depending on the requirements of the polymer system. The sacrificial material removal, debinderizing and sintering processes are dependent upon the materials and include low heat, high heat, liquid wash, evaporation, chemical dissolving, ultrasonic cleansing, isostatic pressing, heating in atmospheres of special fluids or vacuum and other methods.

Described simply, the support bed 10 (FIG. 7) or "Ziggurat" system of this invention is a folding of the proportionally long progressive wedge 2 print-forming line into the area that can be printed by a given commercial printing press. The overall size of a progressive wedge 2 print-forming line is driven by the final dimensions of the completed structure 38 being formed as well as the number of layers and their thickness. A cubic structure 38 for example, would require a long and narrow line as the horizontally sliced images of each partial structure 36 are laid out in a row, the width and number of layers driving the length of the line. The support bed 10 or "Ziggurat" system concept breaks up the length into shorter sections arranged side-by-side that would fit beneath one screen 30 (FIG. 8) or other printing machine working area. For illustrative purposes, an example cubic structure is used that has thirty cross-sections or layers total, bottom to top. Even this modest number of layers requires a long progressive wedge 2. Note that only the last structure is a finished structure 38, they all advance one step at a time picking up the correct new layer with each step.

Figure 6:
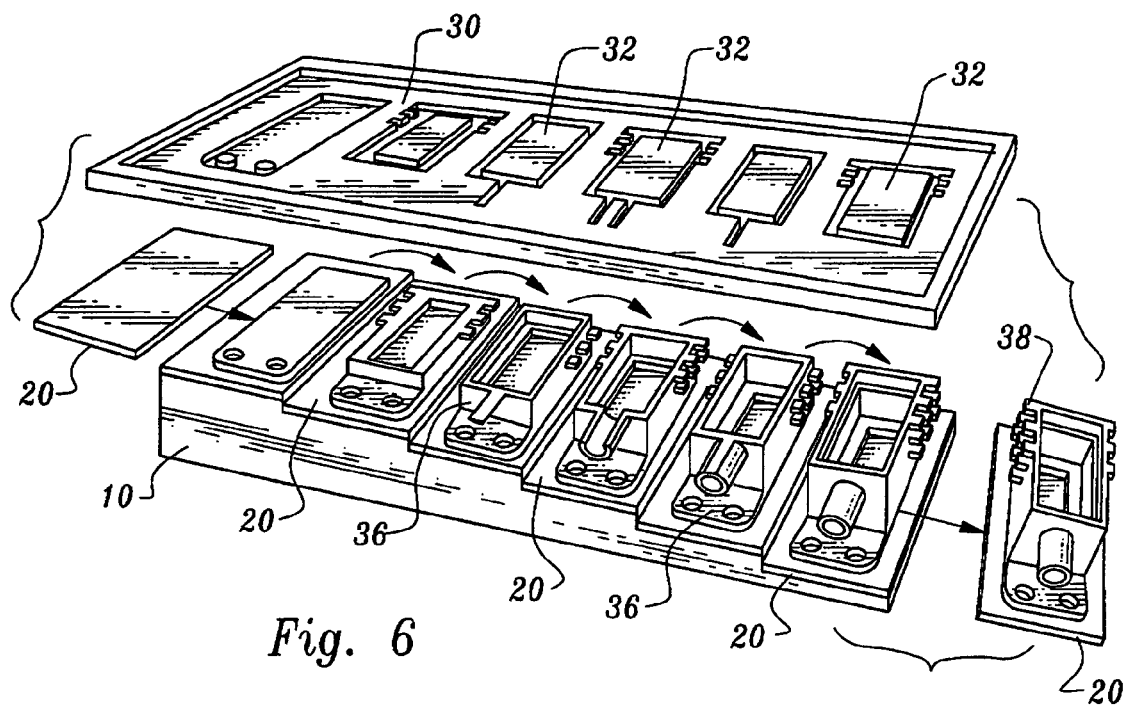
FIG. 6 is a perspective view of a linear high volume print-forming method utilizing substrate blocks and screen printing technology according to this invention.

While the support bed 10 is preferably generally square with a similar number of rows and columns of steps 12 (FIG. 4) for supporting the partial structures 36 thereon, the support bed 10 could be elongate as illustrated in FIG. 6. In the embodiment shown in FIG. 6, substrate blocks 20 are utilized upon the support bed 10 to move the partial structures 36 between adjacent steps before printing with the screen 30 and having the spaces 32 of the screen 30 printing appropriate portions of the completed structure 38. This embodiment is very similar to the progressive wedge high volume print-forming of the prior art, but includes the improvement of the substrate blocks 20, in the various embodiments identified below, to facilitate movement of the partially completed structures 36 along the support bed 10.

Figure 9:
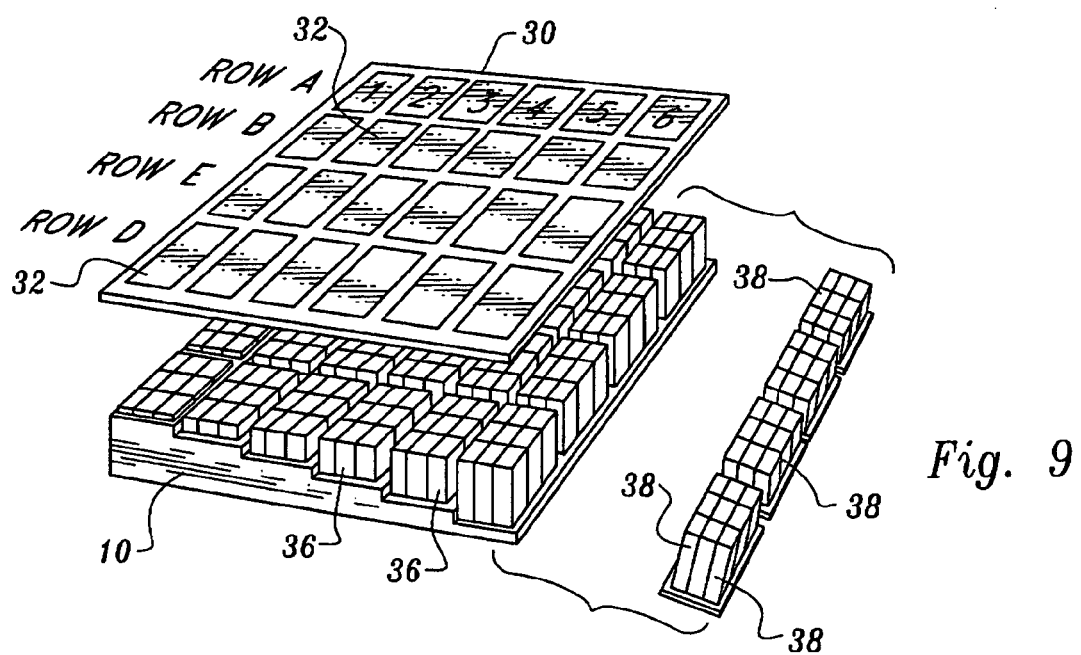
FIG. 9 is a perspective view of a high volume print-forming system utilizing screen printing and simultaneously manufacturing parallel rows of structures.

Another alternative which provides the support bed which is generally square can still function similarly to the progressive wedge by having multiple rows being printed with identical spaces 32 within each column of the screen 30. Thus, multiple rows of partial structures 36 are progressing at a common rate and multiple completed structures 38 are completed after each printing process. Such a variation as is shown in FIG. 9 would be particularly beneficial for relatively simple structures that do not include an excessively large number of layers to form the completed structures 38.

Most structures, however, have dimensions or numbers of layers that can utilize the benefits of the square support bed 10 or "Ziggurat," instead of having multiple, parallel rows of identical structures being printed, perhaps over several printers, side-by-side or one long, custom printer. The square support bed 10 or "Ziggurat" fits more layers, (optimally, all the layers) of a structure under a conventional printer print area.

The support bed 10 is the mechanism under the substrate blocks 20 by which the structures 36 being built are advanced through a pattern of precise positions under the screen 30 or other printing device whereby their top surfaces 22 (FIG. 10) are maintained level and on the same plane for printing purposes. The support bed 10 high volume print-forming system includes the previously described support bed 10 and substrate blocks 20 as well as shuffling and aligning systems to position and move the substrate blocks 20 along their pathway on the support bed 10. Also, while screen printing is referenced primarily in the preferred embodiment of the high volume print-forming system of this invention, this system is also applicable to other methods of printing, including offset, flexo, gravure and offset lithography, as well as other methods of applying thin layers of material to 3-D objects being built up in layers. These methods include, but are not limited to: sputtering, vapor-deposition, plating, electroforming, optical lithography, troweling, extrusion, curing with heat, light, e-beam, x-ray or the like.

Figure 13:
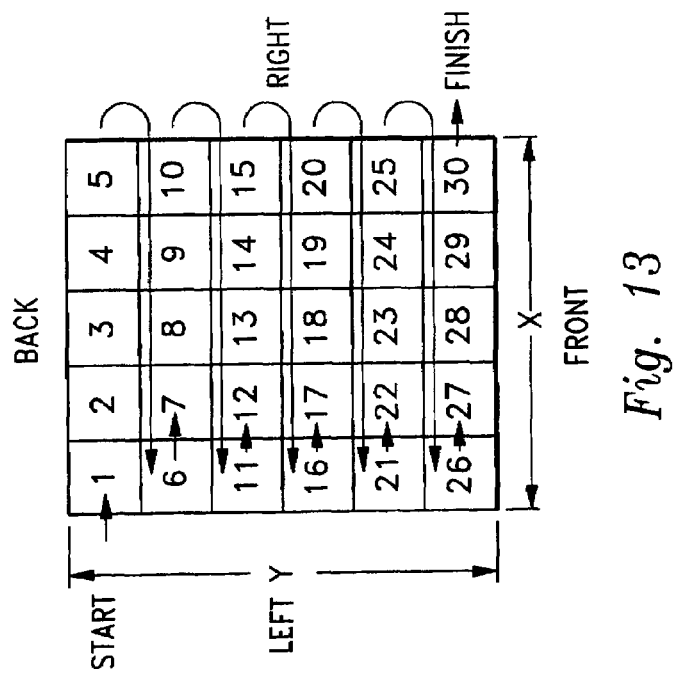
FIG. 13 is a schematic top plan view of a preferred shuffling pattern for substrate blocks upon the support bed according to this invention.

With reference to FIG. 10, a very simplified preferred embodiment of the support bed 10, substrate blocks 20 and shuffling system are disclosed. The support bed 10 is a rectangular mechanism that is practically the size in X and Y (length, or left to right, and width, or front-to-back, respectively) as the image area of the printer screen above it (FIG. 13). In Z (height, or top-to-bottom) direction, it preferably has a graduated, stepped top surface, the size of the rectangular steps 12 in X and Y matching that of the rectangular substrate blocks 20. The Z-axis steps 12 in the support bed 10 are small, equal to the thickness of one printed layer of a structure 38, and step progressively down across the X and Y axes from one corner to the diagonal corner in rows, left to right, then down to the next row, left to right, etc. It follows that the distance in the X and Y axis of each step 12 would be the length and width of a substrate block 20. This "stepping down" process facilitates the printing of structure layers at all the different stages of completion as represented by the images on the screen 30, all at once. The steps 12 provide a preferred form of a plurality of substrate block 20 alignment locations on the support bed 10. Other alignment locations could alternatively be provided. For instance, the support bed 10 could have a slope between alignment locations and the bottom surface 24 of the substrate blocks 20 could have a matching taper to present the surfaces 22 of the substrate blocks parallel to each other and the printer.

Preferably, contained in the thickness of the support bed 10 itself are the components that locate and control the motion of the substrate blocks 20 riding on its top, stepped surface. Therefore, every structure 36 is automatically aligned properly at every step 12 to receive its next layer from the fixed image being printed. The support bed 10 can rest upon a table 14 supporting other related equipment.

The substrate blocks 20 are small, flat, rectangular plates or substrates that the structures are printed directly upon. The substrate blocks 20 preferably include a planar top surface 22 opposite a bottom surface 24 and bordered by edges 26. These substrate blocks 20 carry the structures 36 through the print-forming process, and do not become part of the finished structures 38. They are nested tightly together in a grid-work pattern on top of the support bed 10 and located relative to one another by the support bed 10.

Figure 56:
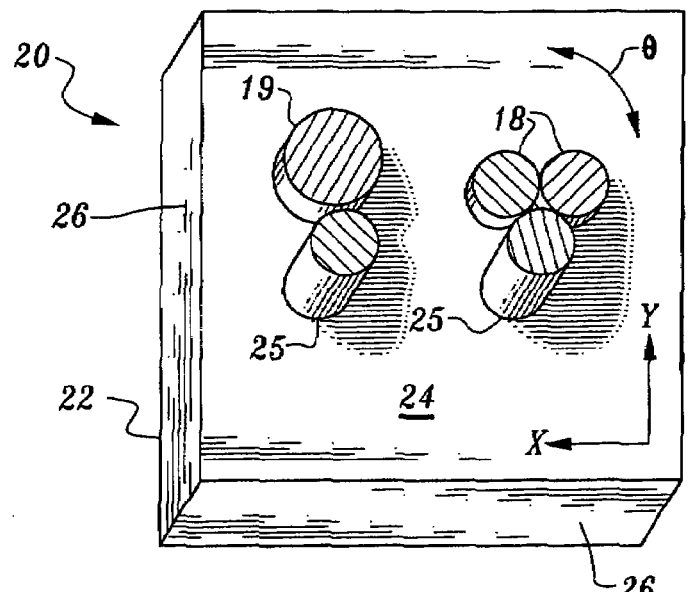
FIG. 56 is an underside perspective view of one of the substrate blocks and alignment pins in the support bed shown in section, taken along line 56-56 of FIG. 57.
Figure 57:
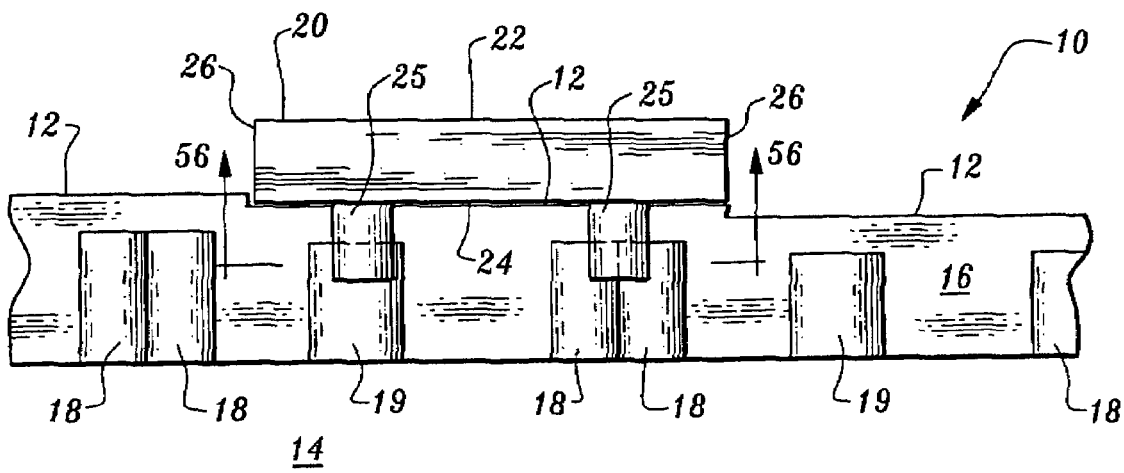
FIG. 57 is a side view of the support bed shown in a section view taken along a line parallel with an alignment slot in the support bed.

The substrate blocks 20 have precise locator features (in a preferred form a pair of parallel, vertical pins 25 on their bottom surface 24) that engage with a slot 16 of the support bed 10 to keep them in proper X, Y translational and rotational (theta) alignment. Specifically, and with reference to FIGS. 56 and 57, one precise alignment mechanism is shown. FIG. 57 shows a full section view of a portion of the support bed 10 of FIG. 10 if viewed from within one of the slots 16 and looking laterally at a series of three steps 12. X-Y pins 18 are shown which are adjacent a side wall of each of the slots 16. When a pin 25 extending from the bottom surface 24 of the substrate block 20 contacts both X-Y pins 18 the substrate block is precisely positioned where desired for printing. The proper rotational alignment is maintained by pushing a second pin 25 of the substrate block 20 against a theta pin 19 adjacent the side wall of the slot 16. A lateral force on the substrate block 20 or pins 25 themselves, such as applied by a spring loaded lever, toward the X-Y pins 18 and the theta pin 19 ensures contact and proper position and rotational alignment. In addition, vacuum hold-down ports can be provided with maximized surface area contact with the bottom of the substrate blocks 20 for additional traction.

The purpose of the substrate blocks 20 is to carry the structures 36 being print-formed through the entire printing process in a particular positional order on the support bed 10 as described below. As they are moved across the stepped-down surface of the support bed 10, the tops of the printed structures 36 stay co-planar and level relative to each other for printing while the substrate blocks 20 (and the bottom of the structures 36 being print-formed) step down the support bed 10. The support bed 10 forms the stair-stepped foundation, as the structures grow downward to full size, from their top surface. This can be seen in FIG. 14.

Substrate block 20 movement in general: The number of different layers in a particular structure 36 is preferably the same as the number of substrate blocks 20 on the support bed 10. For the sake of this primary description, we assume that the structure under present consideration can be print-formed with thirty print cycles, the structure 36 therefore has thirty cross-sections to be printed. The substrate block 20 flow is from left to right in the X direction, and back to front in the Y direction, with structures 36 starting in the back left position and finished structures 38 on substrate blocks 20 coming off the support bed 10 on the right front corner.

The path each substrate block 20 travels is preferably much like the path of one's eyes reading the print on a page, left to right, skip down one row, left to right, and so on. This is the order of the structure's cross-section images on the spaces 32 of the screen 30 (FIG. 4) as well, and therefore each move of each substrate block 20 positions it to receive the correct next layer to build the 3-D print-formed structure 38. This movement is referred to as "shuffling" of substrate blocks 20.

Starter substrate blocks 28 (FIG. 14): Every space on the support bed 10 must be filled with a substrate block 20 to receive the printed images. Because the support bed 10 has a stepped-down surface, the first set of substrate blocks 20 at the beginning of a production printing run, called "starter substrate blocks 28," are individually unique in height, each being one print-layer thicker than the previous starter substrate block 28. This assures that the top surfaces of all substrate blocks 20 are level at the start, which is usually necessary for printing.

Figure 14:
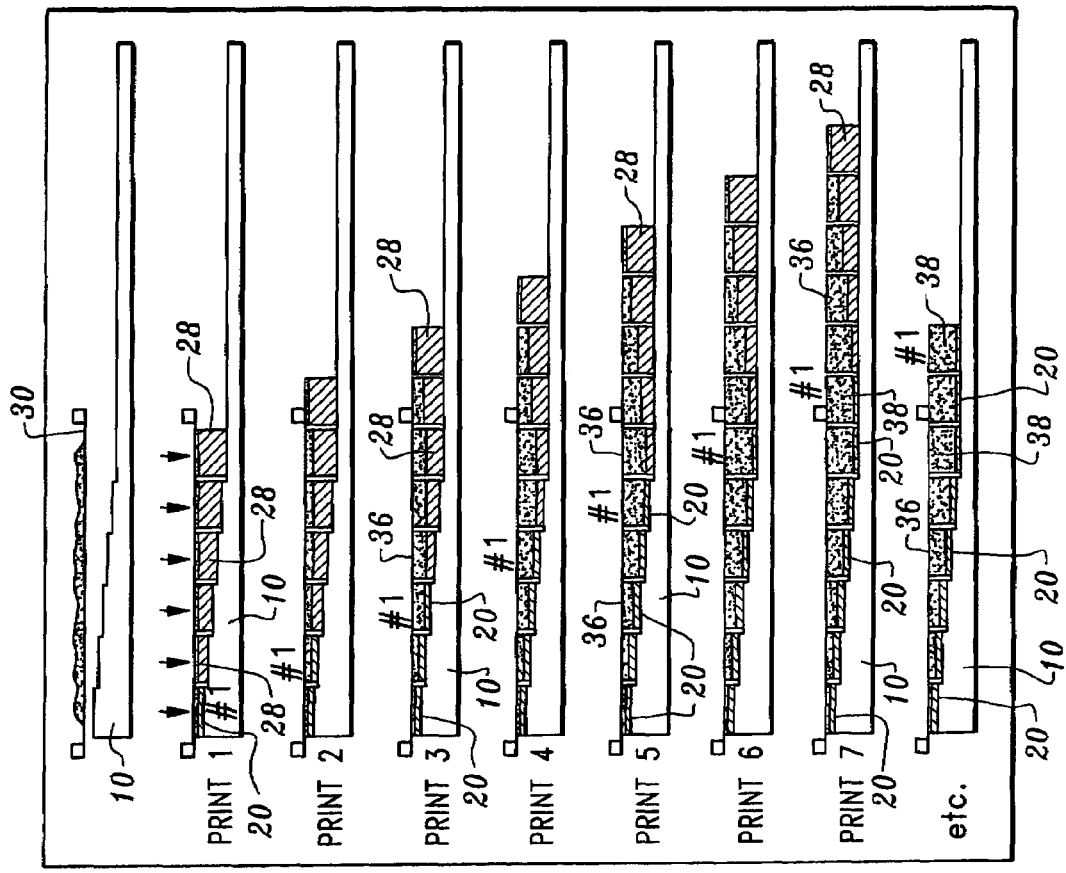
FIG. 14 is a schematic representing the process of high volume print-forming according to this invention and further illustrating how starter substrate blocks are utilized along with regular substrate blocks to initiate the high volume print-forming process according to this invention.

The starter substrate blocks 28 will produce partial structures, but as they are moved through all the positions they will be replaced with the "production-run substrate blocks 20" or "regular substrate blocks 20," all of the same thickness, that carry the production-run of complete structures 38. The starter substrate blocks 28 are taller than the production-run substrate blocks 20 as they need to keep the top surface level above the stepped-down support bed 10 surface at the beginning of the printing process before there are taller printed structures consisting of multiple layers made over the declining steps of the support bed 10 (FIG. 14).

Substrate block 20 movement in particular (FIG. 15): The following is a description of the movement or shuffling of substrate blocks 20 at the beginning of a production print-forming run: Using the simplified example again of a structure with only thirty layers, the support bed is fully loaded with twenty-nine starter substrate blocks and one regular substrate block (in the #1 spot), and the first layer is printed on every substrate block.

The printing screen has thirty different sub-images, in the same order as the thirty substrate blocks, all acting as one large image. It will print over and over again. This printed layer prints a different image on every substrate block, only being correct (i.e., the bottom image of the structure) for the #1 substrate block in the back left corner, as every image on the screen represents a different layer of the structure, from the bottom layer up. This one substrate block represents the first production-run structure, as the rest of the substrate blocks (the starters) are just providing a surface for the screen printer to print on at the beginning of a printing run, none of the other images being the first layer of the structure, and therefore none of the starter substrate blocks carrying production-run structures.

Figures 15, 16, 17, 18:
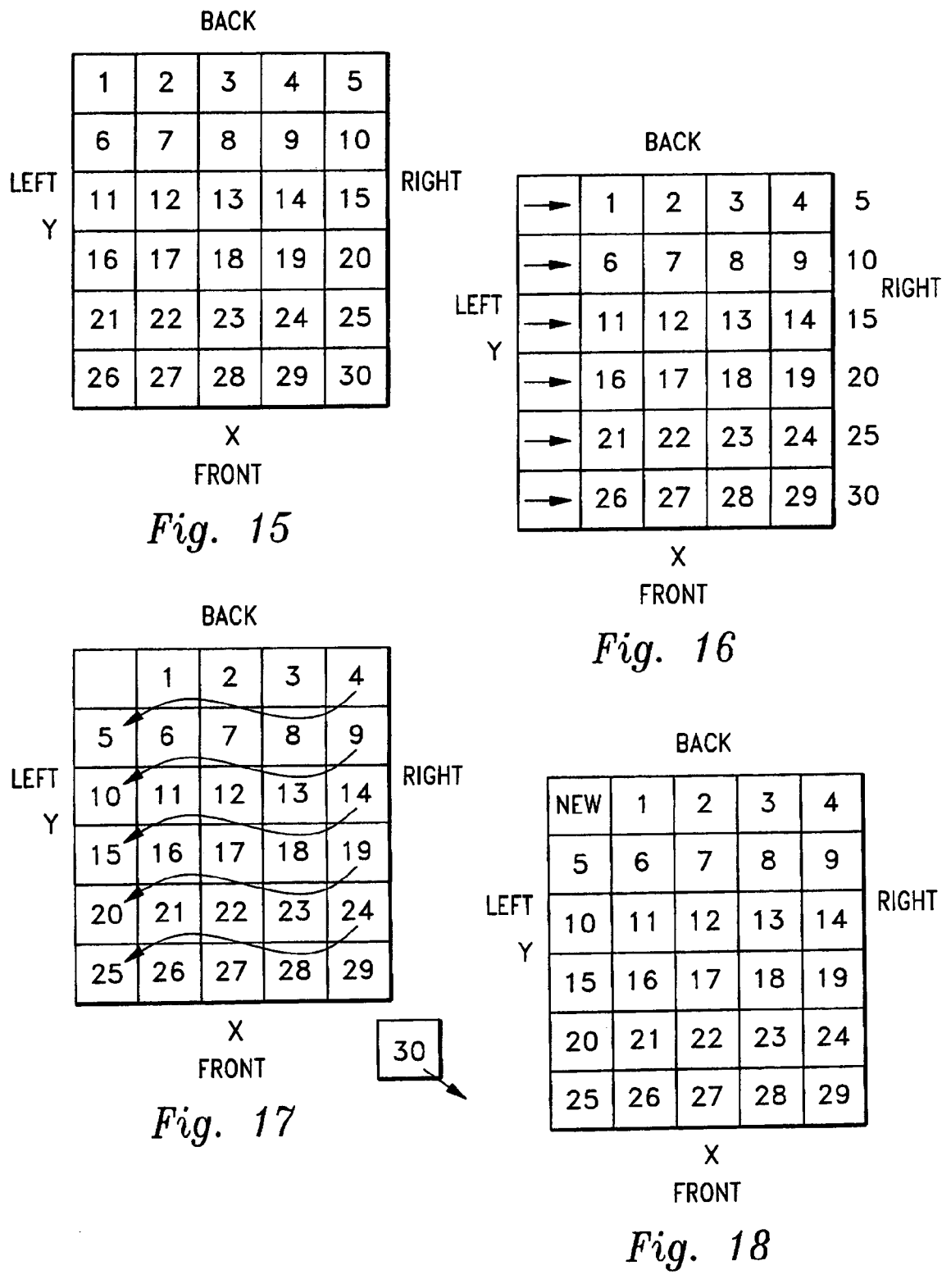

After this first printing, all of the substrate blocks are shuffled precisely and in unison one place to the right. This leaves an empty column on the left and pushes a column of substrate blocks off the support bed on the right (FIG. 16).

Displaced substrate block #30 is now finished. Being a starter substrate block with only one print on it, it is taken off-line for recycling or reclaiming by combining with "left-on-base substrate blocks" (described below). The rest of these displaced substrate blocks are then moved in the Y direction one place toward the front and reset in the X direction to the left side in the empty spaces on the support bed, both moves shown as one diagonal move. This leaves one starter substrate block with its single print displaced off the support bed altogether and one blank space in the back left corner for the addition of another new production-run substrate block (FIG. 17).

As this precise, print-and-move process repeats, the starter substrate blocks all work their way through and out, each one carrying one more print on it than the last one. After twenty-nine prints, the first regular substrate block (#1) will carry the first complete structure off the support bed front right corner. From this point on, every print cycle will produce one finished structure on a continuous basis on regular production-run substrate blocks. This is where the production-run efficiency begins. Notice how the substrate block numbers have shifted for the second print from the first (FIG. 18).

In this example, the printer prints all the cross-sections of one complete structure every time it prints; in thirty different places on thirty different substrate blocks, each carrying a structure that is in one unique successive stage in the process of being print-formed.

Left-on-base substrate blocks: At the end of a run there will likewise be an equal number of unfinished structures printed just to get the last needed structure through the support bed and completed. All structures that remain on the substrate blocks after that one are incomplete and may be discarded or reclaimed by combining them with the incomplete structures from the starter substrate blocks to produce complete structures. These substrate blocks at the end of a run are called "left-on-base" substrate blocks, but they are no different than production-run substrate blocks. They simply don't have complete structures built on them and need to be cleaned off before reuse. For most production runs, the length of the run in between the starter substrate blocks and the left-on-base substrate blocks should be sufficient to make discarded quantities, if any, insignificant.

Alternatively, left-on-base substrate blocks with incomplete structures built on them may be reused, in place and as is on the support bed, as starter substrate blocks. They provide an appropriate and co-planar top surface for printing new layers of a new run, even if the structures to be printed are completely different. The new structures would simply need to have the same overall form factor to fit on the same substrate blocks on the same support bed to use the left-on-base substrate blocks from the previous run as starter substrate blocks for the next. Thus, the left-on-base structures can be used as starters for the next run, if desired. Later these substrate blocks could be cleaned and reused.

Figure 19:
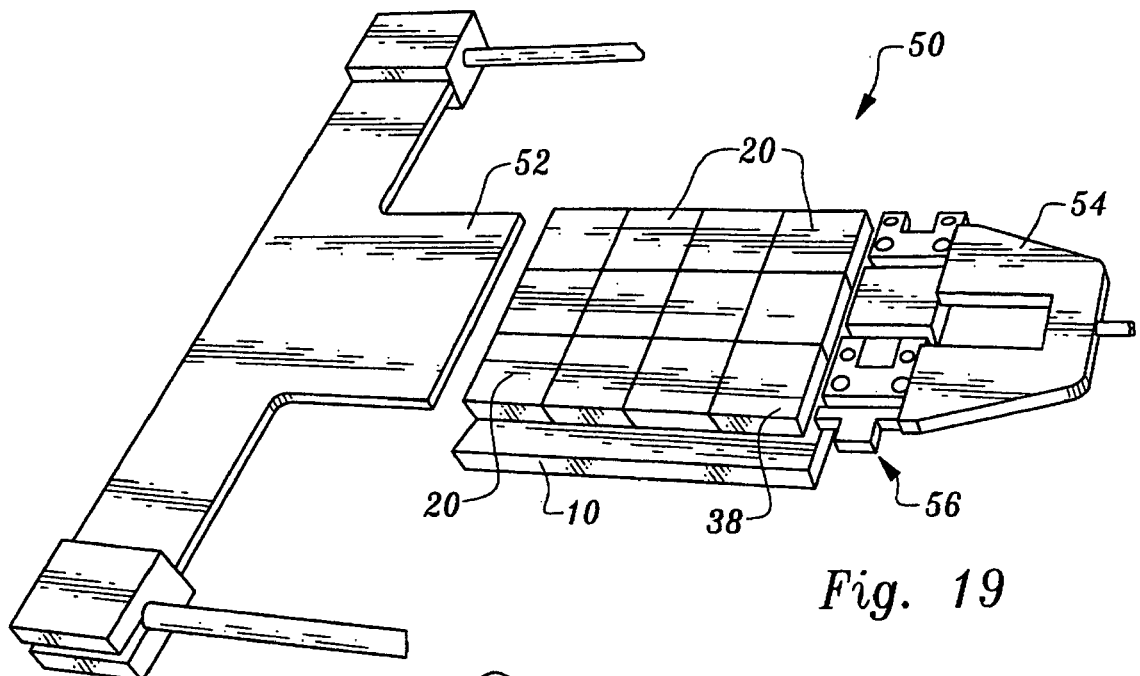
FIG. 19 is a perspective view of a preferred form of shuffling machine according to this invention.

FIG. 19 shows an embodiment of a shuffling machine 50 that is used to precisely locate the support bed 10 and shuffle the substrate blocks 20 with accuracy and control on the support bed 10 between print-forming cycles. The machine 50 moves the substrate blocks 20 in the same pattern as that illustrated in FIGS. 15-18 described above.

Figure 20:
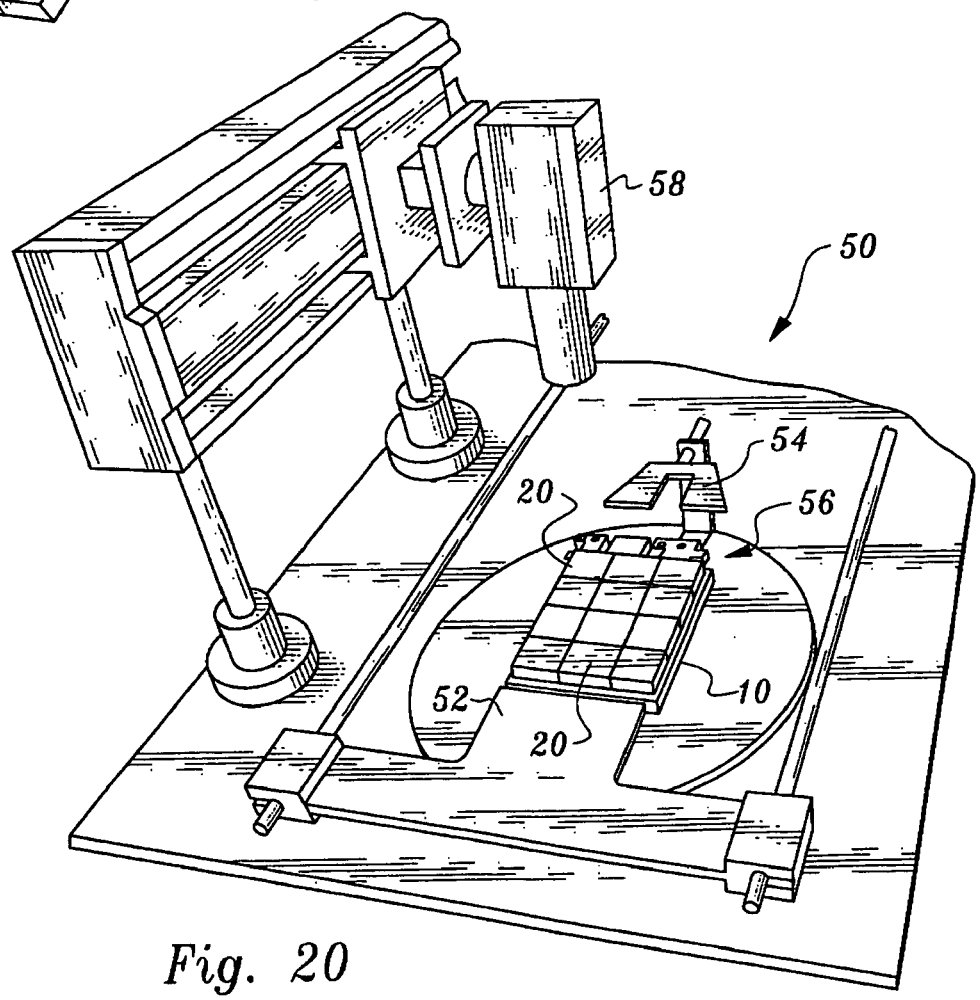
FIG. 20 is a perspective view further illustrating details of the preferred shuffling machine of this invention.

Repeatable alignment is built into every component of the shuffling machine 50 (FIG. 20), including the base that supports and locates a vacuum chuck to precisely hold the support bed 10, as well as provide a stable foundation for the other components, the video camera and monitor vision system 58 that provides positional feedback between print-forming cycles, the shuffling mechanism that moves the substrate blocks 20 "en bloc" one step in a controlled manner so as not to damage the partially built structures 36 on the substrate blocks 20 and the pick-and-place cartesian robot that lifts the row of substrate blocks 20 displaced from the support bed 10 and replaces them in their new position on the support bed 10.

The simplified support bed 10 shown herein is analogous to the support bed 10 shown in FIG. 10. Four columns of substrate blocks 20 are shown in three rows upon the support bed 10. Because the support bed has multiple steps 12 (FIG. 10) each at different heights and because the substrate blocks 20 have had different amounts of printing to form partial structures at various different stages, upper surfaces of the partial structures upon the substrate blocks are planar.

After a printing step, when shuffling is to occur, the shuffling machine 50 provides for shuffling as follows. First, the shuffler blade 52 moves toward and engages the substrate blocks 20 in the first column closest to the shuffler blade 52. The shuffler blade 52 pushes the substrate blocks 20 a distance equal to a width of the substrate blocks 20 and into abutment with the damper blade 54 which optionally assists in preventing the substrate blocks 20 from traveling too far. The substrate blocks 20 will all drop down slightly as the steps on the support bed 10 are each one print layer thickness lower in the direction of substrate block 20 movement. The shuffler blade 52 provides one form of shuffler with other shufflers discussed below, such as the pushers 152 and 156 of FIGS. 58-60 and the lift rails 72 of FIGS. 26-31, also contemplated.

A spatula 56 or other form of lifter can then lift the entire column most distant from the shuffler blade 52 which has now moved off of the support bed 10. This last column has one substrate block 20 which includes a completed structure 38 thereon which is removed. The other substrate blocks are moved laterally to the next row and replaced at a position on the support bed 10 closest to the shuffler blade 52. Finally, a new substrate block 20 is placed in the column closest to the shuffler blade 52 and at a location in this column most distant from where the completed structure 38 was removed. The substrate blocks 20 have now been fully shuffled and are ready for another printing cycle. The above described shuffling machine 50 provides one form of a means for moving the substrate blocks 20. Other moving means are described below.

The substrate blocks 20 are moved along the substrate block 20 flow pathway as described previously and below, in FIGS. 21-46 and 58-60. Different methods may be used to move the substrate blocks 20 (shuffling) along the pathway and to precisely align them (registration) and lock them in place in the next position on the support bed 10 prior to print-forming the next layer. This is important to achieving the required tolerances per the design specifications of the structures 38.

Methods for shuffling the substrate blocks 20 along the substrate block flow pathway include: by hand; sliding or pushing individual substrate blocks 20 or rows of substrate blocks 20 with a mechanism from within the support bed 10, such as moving substrate blocks 20 with "rubber-wheels," mechanical fingers, belts, magnets, vacuum, et cetera, driven from below, sides and/or top; sliding or pushing individual substrate blocks 20 or rows of substrate blocks 20 with a mechanism from outside the support bed 10, such as shown on the shuffling mechanism 50, or in other forms such as simply mechanical, electromagnetic, hydraulic, pneumatic, electric, vacuum, et cetera.

Since all substrate blocks 20 must slide together to their new positions, it is useful to loosen them all at once from their locked registration positions and "flow" them "train-like" or "snake-like" to the new position. Note that concepts that include substrate blocks 20 traveling in a path that moves out and back into the print area are feasible. At any place where one or more adjacent substrate blocks 20 exist temporarily outside the print area, they will have an identical number of layers printed on them and will each pick up their next correct layer as they re-enter the printable area.

Methods for precisely aligning the substrate blocks 20 into the correct positions on the support bed 10 can include mating or aligning features on or between the two including: locator pins, rails, slots, wedges, walls, retainers, et cetera, which may be retractable (retracted prior to shuffling) or stationary, providing alignment from above, the sides or below, built into the support bed 10 or substrate blocks 20, or, and perhaps in addition to, shallow wells on the support bed 10 for the substrate blocks 20 to fit into. Methods for locking the substrate blocks 20 firmly onto the support bed 10 also may include: vacuum, magnetic, static electric or mechanical devices, etc. or a combination.

When the number of structure layers exceed the print screen area of a single printer screen, additional screens can be used that have the rest of the structure layer images. All the substrate blocks are printed with the first screen, then all with the second, etc., until all layers are printed, making the structure formation semi-continuous. This can be accomplished with multiple printer stations set side by side, each with it's own support bed, or with a continuous support bed that spans the multiple stations and a substrate block flow pathway that moves under the multiple printer stations (FIG. 21).

There are a number of alternate substrate block 20 pathways possible, as shown in FIGS. 32-43 and in FIGS. 44 and 45, for example some being: left to right, down one row and back to the left again, left to right, down one row and back to the left again, etc. until reaching the bottom right hand corner of the support bed; variations such as right to left or bottom to top; multiple elongated S-curves or zig-zags across or up and down the support bed 10, receiving prints in both directions instead of returning to the left end in one move; circular or spiral (both around a grid of rows and columns or a true circular or irregularly curve shaped) pathway outward from the center of the support bed 10 or inward towards the center of the support bed 10; and any of the above pathways on a large support bed 10 that spans multiple printing machines. These and other similar concepts can reduce the number of independent substrate block 20 moves, making the system mechanically simpler.

If all the layers to a small structure can be spread over one half or less of the printable area of a screen, all the images can be duplicated one or more times on different places on the same screen, resulting in multiples of finished structures coming off the support bed 10 with each print cycle. Each support bed 10 in this scenario would have more than one start-to-finish path on its top, stepped surface and each substrate block 20 would only travel over one of those paths, not the whole support bed 10. A similar support bed 10 form is shown in FIG. 9.

When the printed film thickness is less than one layer thickness, two or more sub-layers may be printed to create one layer. This in effect gives an improved level of detail control in that it can reduce the "layered texture" on structure side-walls, as well as being a way to provide "on-the-fly" height adjustment. If a structure is growing too quickly or not quickly enough with successive layers, a sub-layer on an entire screen print can be added or omitted. The resultant "adjustment zone" in the structure is within the minimum feature size specification and therefore not significant to the geometry of the structure but keeps it correct in the Z, or vertical dimension. Sub-layers of positive and negative materials can be printed alternately to maintain planarity.

For the sake of simplicity in the above descriptions of the HVPF™ process, the examples are described as being print-formed with screen printing technology and there is little discussion of number of screens needed per layer beyond positive screens (for the structures themselves) and negative screens (for the temporary support material). For each layer with more than one positive material (as in multi-material structures) an additional positive screen is needed for each new material. This is analogous to standard four-color offset printing presses where there are four printing heads for the multiple colors.

After the print-forming part of the process, the structures may need to be debinderized and/or sintered. To maintain the structural integrity of pre-sintered structures through the process, the structures may remain on the substrate blocks as long as possible. Therefore the substrate blocks in this first embodiment can be constructed such that they are able to go through the removal step of the temporary "sacrificial"

support material and/or possibly the sintering and debinderizing processes, along with the structures.

Planarizing and curing of the structures between print cycles are two other steps that can involve the substrate blocks. To describe the print-forming sequentially, a typical two-material print cycle, after initial substrate block alignment with vision and/or mechanical systems, may be as follows:

1. Print one layer of positive material on substrate blocks.
2. Cure the new structure layer to specific hardness in a UV light station or other curing system. Repeat steps 1 and 2 to create multiple sub-layers.
3. Print one layer of negative material around the last positive material on the same layer.
4. Cure the new negative layer to hardness in the UV light station or other curing system. This may involve more sub-layer printing.
5. Planarize the entire top layer to insure flatness of both positive and negative materials, as needed.
6. Move all the substrate blocks to new positions.
7. Repeat above.

There are applications across many disciplines and industries to which the HVPF™ process may be applied. Such uses include static and active mechanical, electromechanical, electrical, chemo and thermodynamic structures and systems. HVPF™ structures can be utilized in many practical fields such as in electromagnetic and fiber-optic devices for radio and telecommunications, pharmaceutical, medical, automotive, aerospace, computer circuits and components, et cetera. The freedom to design optimized shapes, materials and performance into such diverse applications as complex fluidics, liquid crystal displays, 3-D circuitry and mechanical components like springs, sensors or organic structural elements, requires the flexibility and adaptability of process that the HVPF™ process embodies.

With particular reference to FIG. 21, a first alternative shuffling pattern is disclosed. In FIG. 21 the pattern 60 provides a "back-and-forth" path depicted by the arrows which crosses multiple separate support beds 10. FIG. 22 depicts use of ribbons 62 between rows of substrate blocks 20. Such ribbons can allow the substrate blocks 20 to pass freely close to each other, and such ribbons 62 could alternatively be attached to and move with the substrate blocks 20 to facilitate shuffling thereof. In contrast to previous embodiments, it is necessary with the shuffling pattern 60 for substrate blocks 20 to go from moving within a row to movement in a way which keeps the substrate blocks 20 in the same column but move to an adjacent row. When such turning is required, various different turning methodologies are disclosed in FIGS. 23-25.

In FIG. 23 a non-rotating substrate block turning structure is shown. Particularly, a no rotation curb 64 is shown which allows the substrate blocks 20 to move to the adjacent row without rotation when abutting the no rotation curb 64.

In FIG. 24 a turning system is shown which includes a rotating disk 67 and 180° rotation curbs 66. When the substrate blocks 20 are guided by the rotation curbs 66 onto the disk 67, they are rotated along this path and back onto the next row after 180° of rotation.

In FIG. 25 a turning mechanism is shown which utilizes a 90° rotation curb 68 which guides the substrate blocks 20 onto an adjacent row with 90° of rotation. The amount of rotation would need to be reflected in the spaces 32 on the screen 30 for the adjacent row (FIG. 4). Also, some of the substrate blocks 20 can be away from the printing area for one or more cycles, if necessary to accommodate this turning action.

With particular reference to FIGS. 26-31 an alternative shuffling tool 70 is described. This alternative shuffling tool 70 works with the support bed 10 and substrate blocks 20 to shift the substrate blocks 20 to the next position between printing cycles. Particularly, lift rails 72 are provided which reside within grooves 73 in the support bed 10. As depicted in FIGS. 26-31, the lift rails 72 can alternatively be down within the grooves 73 or lift up out of the grooves 73 to lift the substrate blocks 20 off of the support bed 10. The substrate blocks 20 can then be moved laterally and the lift rails 72 can be returned down into the grooves 73 with the substrate blocks 20 having been moved.

With particular reference to FIGS. 32-43 a second alternative shuffling pattern is described. In this pattern, a spiral shuffling pattern is followed. Particularly, a finished block 82 is removed from a center of the support bed 10. A first moving block 83 would then be shifted to where the finished block 82 previously resided before it was removed. Next, a second moving block 84 would be shifted to the vacated space. The vacated space is in FIGS. 32-43 are depicted with stippling. Spaces with dots therein represent substrate blocks 20 which have completed their movement.

Next, a third moving block pair 85 (FIG. 35) would be shifted together linearly. Next, a fourth moving block pair 86 (FIG. 36) would be shifted as shown. Next, a fifth moving block triplet 87 would be moved linearly as depicted in FIG. 37. Next a sixth moving block triplet 88 would be moved linearly as depicted in FIG. 38.

This system would be continued as indicated until the last moving block row 89 is moved linearly as depicted in FIG. 43. Hence, twelve steps would be involved to shift all thirty-six substrate blocks to their new position before the next printing step. This shuffling pattern could also be operated in a pattern reverse to that described above.

FIGS. 44-46 depict further various alternative shuffling patterns. In FIG. 44 a third alternative shuffling pattern is disclosed which is a generally spiraling pattern spaced upon three substrate support beds 10. FIG. 45 provides a fourth alternative shuffling pattern 92 which is a generally zig-zag pattern split onto three separate support beds 10. Such variations in the shuffling pattern could also be applied to an embodiment using a single support bed 10, which is generally preferred when practiced.

FIG. 46 shows a fifth alternative shuffling pattern 94 which is a generally zig-zag pattern spaced across three separate support beds and with multiple steps spaced on the support beds being provided at a common height should the high volume print-forming method being utilized call for such an arrangement. This pattern 94 could also be employed on a single support bed 10.

Figure 47:
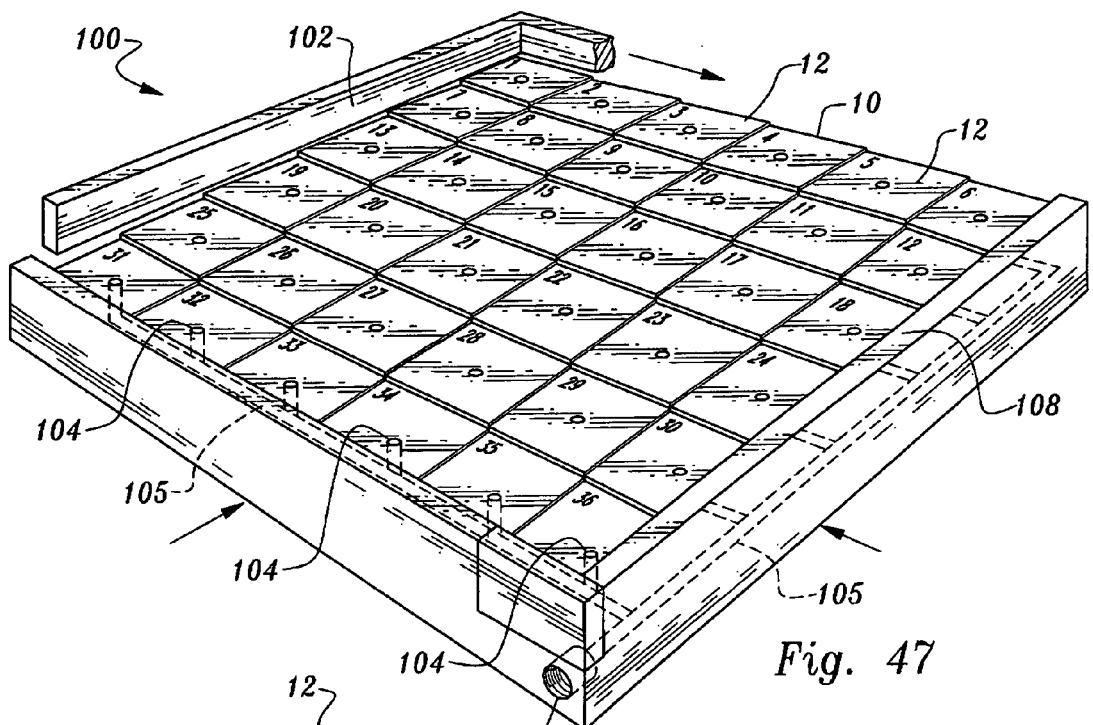
FIG. 47 is a perspective view of a substrate block holding tool for securely holding the substrate blocks in position upon the various steps of the support bed.

With particular reference to FIGS. 47-55, details of the substrate block holding and alignment systems are described. Most preferably, vacuum systems are utilized to securely hold the substrate blocks 20 upon the support bed 10 when printing. In FIG. 47, a substrate block holding tool 100 is shown integrated into the support bed 10. Each of the steps 12 includes at least one vacuum hole 104. A registration wall 102 is preferably provided along one side of the support bed 10. A manifold 105 is coupled to each of the vacuum hole 104 and to a vacuum supply port 106. An end wall 108 is also provided opposite the registration wall 102. The end wall 108 can provide a force upon substrate blocks securing them up against the registration wall 102 to ensure proper position. The end wall 108 and registration wall 102 would thus function somewhat like a vise as well as for proper alignment.

Vacuum would then be applied to secure the substrate blocks down against the steps 12 of the support bed 10. Printing could then occur. Most preferably, rather than merely providing vacuum holes 104, a vacuum groove 116 would be provided on each of the steps 112. Additionally, support holes 114 and support slots 115 could be provided through which lift pins 117 could pass. The lift pins 117 would be coupled to a separate pin support plate 118 capable of moving up and down through the support holes 114 and slots 115 to pass into registration holes 120 and registration slots 121 provided in the substrate blocks 20. These lift pins 117 could provide the dual function of properly aligning the substrate blocks 20 upon the support bed 10 and lifting the substrate blocks 20 slightly up off of the support bed 10 to break the vacuum seal that may tend to form, so that the substrate blocks 20 are ready for shuffling.

Figure 48:
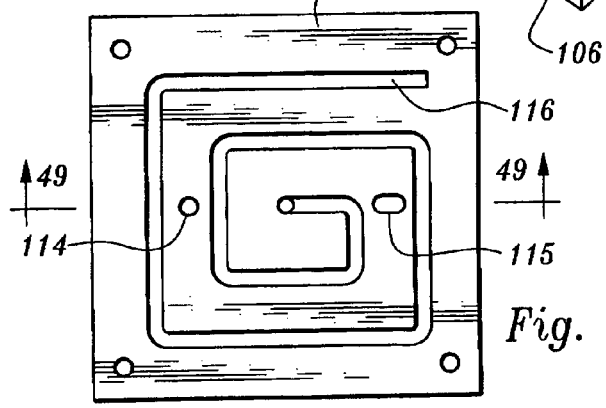
FIG. 48 is a top plan view of one step of the support bed including a second alternative substrate block holding and alignment tool which includes vacuum to hold the substrate block adjacent the support bed.
Figure 49:
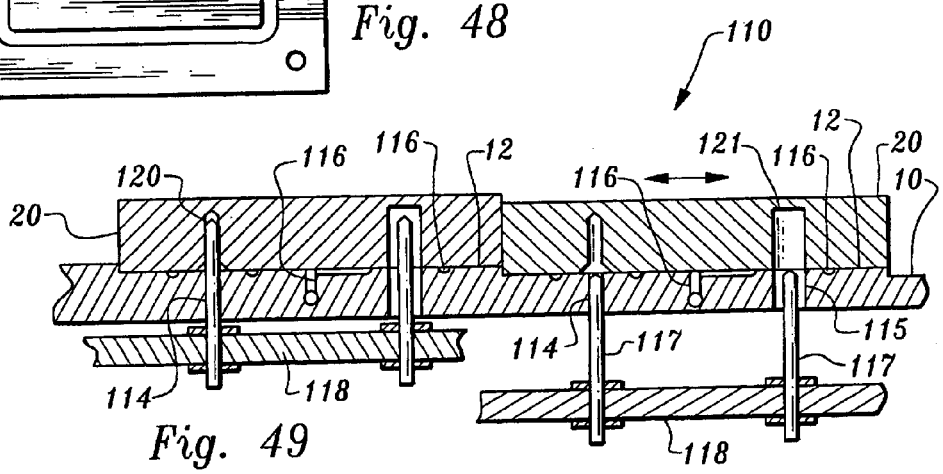
FIG. 49 is a full sectional view of that which is shown in FIG. 48 and illustrating how a combination of vacuum and lift pins can be used for alternatively holding, aligning and lifting the substrate blocks before utilization of a shuffling tool to move the substrate blocks where desired upon the support bed.
Figure 50:
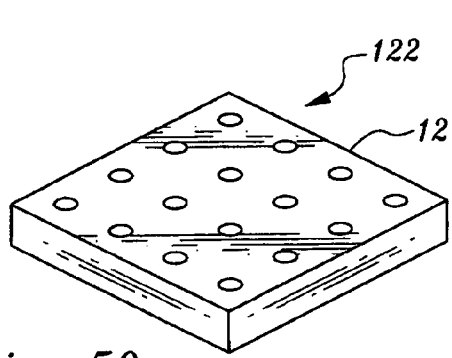
FIGS. 50-53 reveal various alternative vacuum hole patterns for steps of the support bed.
Figure 51:
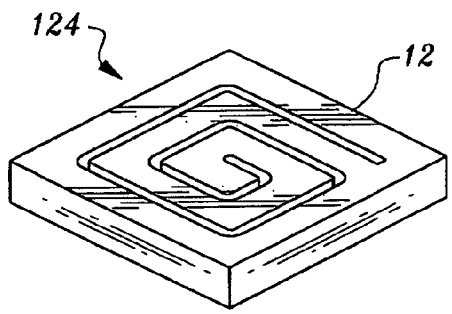
Figure 52:
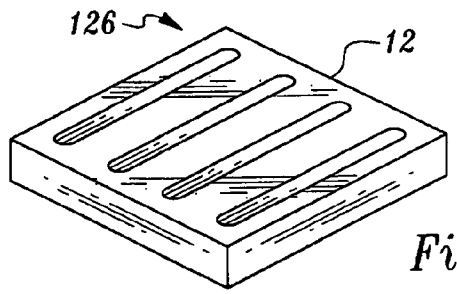
Figure 53:
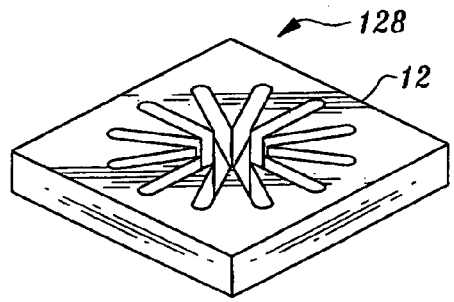
Figure 55:
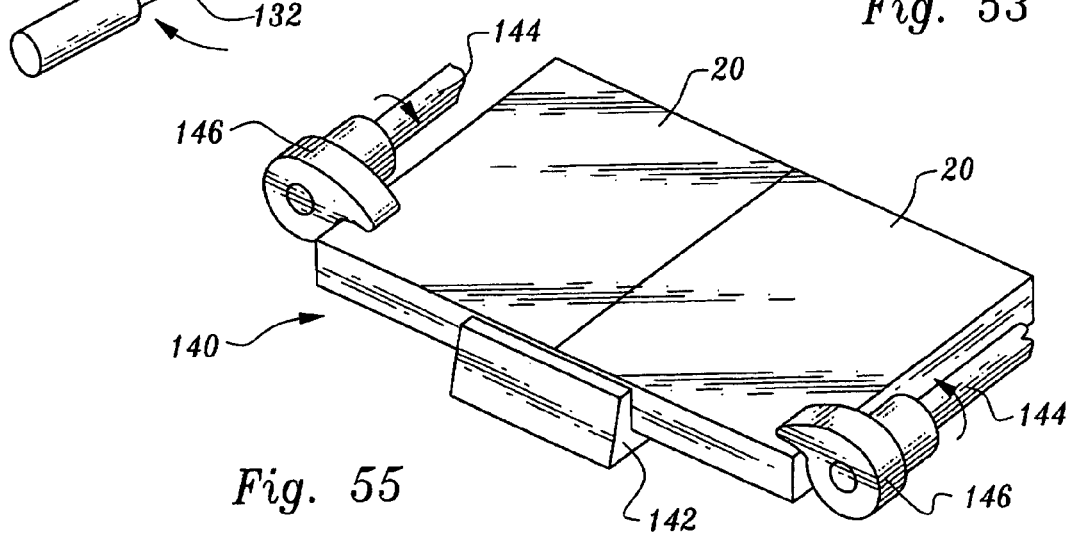
FIG. 55 is a perspective view of a mechanical holding tool for holding the substrate blocks upon the support bed.

While a spiral pattern for the vacuum groove 116 is shown in FIG. 48, and similarly in FIG. 51, other patterns could similarly be provided. For instance, a multiple hole pattern 122 could be provided (FIG. 50). A spiral pattern 124 could be provided (FIG. 51). A multiple cavity pattern 126 could be provided (FIG. 52) or a star pattern 128 could be provided (FIG. 53).

Figure 54:
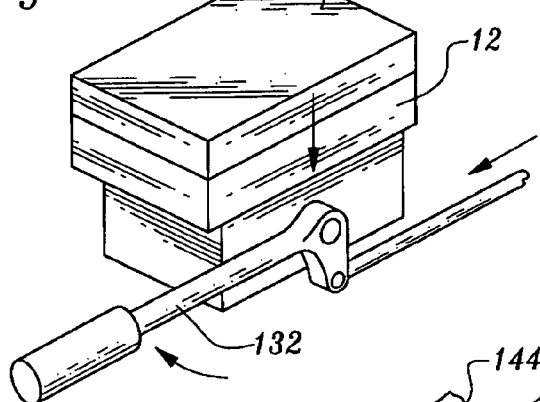
FIG. 54 is a perspective view of a magnetic holding tool to hold the substrate block upon the support bed.

As an alternative (or in addition) to utilization of vacuum to hold the substrate blocks 20 in position upon the support bed 10, a magnetic holding tool 130 could be utilized (FIG. 54). With such a system, magnetic force would be applied, such as through actuation of a lever 132 to bring magnets into proper position to secure the substrate blocks 20 to the steps 12 of the support bed 10.

As another alternative, a mechanical holding tool 140 could be utilized which uses mechanical force to hold the substrate blocks 20 adjacent the support bed 10. In particular, substrate blocks 20 could be rotated against a stop 142 for proper positioning and then rods 144 could be rotated to turn clamps 146 into position to engage the substrate blocks 20 and secure them down upon the support bed underlying the substrate blocks 20. With either vacuum, magnetic or mechanical holding tools, the substrate blocks 20 are held securely in place during the printing process to ensure that the next successive layers for the structure are properly placed in the precise position required for the proper formation of the structures.

Figure 58:
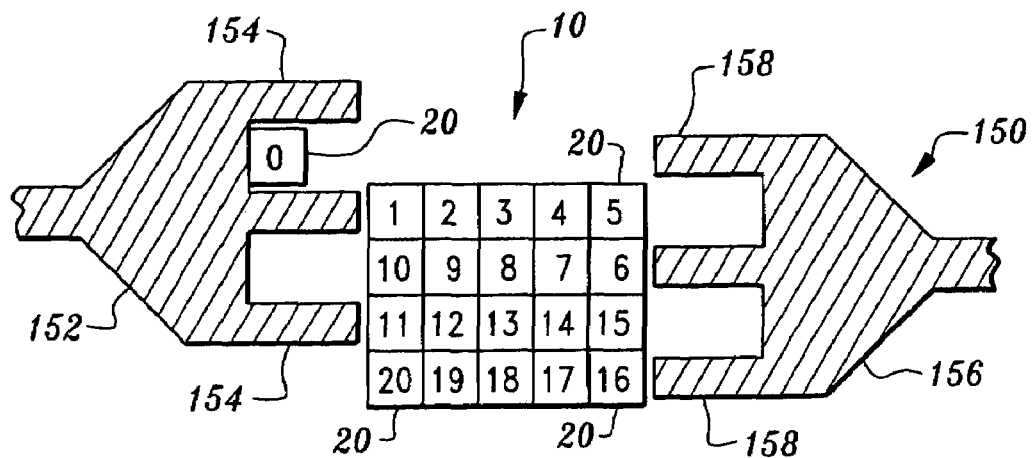
FIGS. 58-60 show sequential schematic views of a second alternative shuffling tool for moving the substrate blocks upon the support bed.
Figure 59:
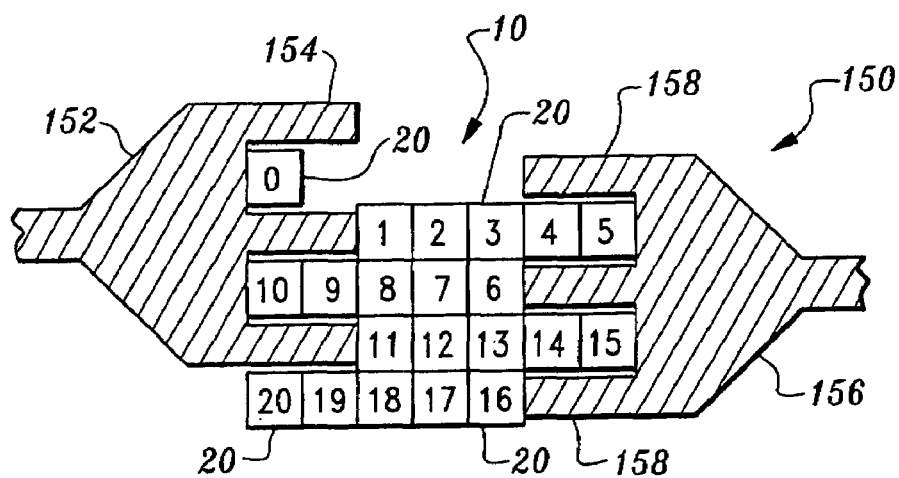
Figure 60:
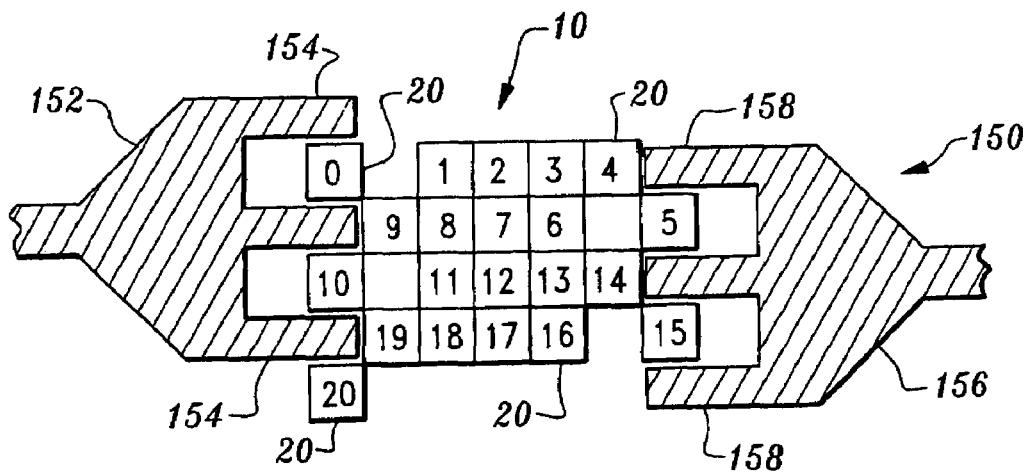

With particular reference to FIGS. 58-60, a second alternative shuffling tool 150 is described for facilitating shuffling according to the shuffling pattern 60 of FIG. 21, shown on a single support bed 10 of twenty numbered substrate blocks 20 for illustration purposes. This tool includes a left pusher 152 with multiple fingers 154 and a right pusher 156 with multiple fingers 158. The pushers 152, 156 have their fingers 154, 158 abutting the opposite ends of alternating rows of substrate blocks 20. The pushers 152, 156 first move toward each other to offset alternating rows by two substrate blocks (FIG. 59). Next, the pushers 152, 156 move laterally to relocate substrate blocks 20 at the ends of rows down to the next row (FIG. 60). Finally, the pushers 152, 156 push the substrate blocks 20 of each row back together with each block 20 having advanced one space. With each cycle a last block 20 is removed (#20) and anew block 20 is added (#0).

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A system for high volume print-forming comprising in combination:
   a bed having a plurality of alignment locations;
   at least two of said alignment locations positioned at different heights relative to each other;
   a plurality of substrate blocks, each substrate block including a substantially planar exposed surface and adapted to be positioned on one of said alignment locations of said bed and to move between said alignment locations while supporting upon said exposed surface a structure being print formed;
   a printer located adjacent said exposed surfaces of said substrate blocks and adapted to print material down toward said substrate blocks and upon the structures being print formed upon said substrate blocks;
   wherein said printer includes a plurality of print spaces overlying said alignment locations of said bed, said spaces adapted to print material in patterns corresponding with a geometry of different layers of a common structure to be formed; and
   wherein said printer is sized at least as large as said bed, said alignment locations on said bed including steps, wherein a number of said spaces contained within said printer is equal to a number of said steps in said bed, wherein each said space on said printer has a pattern corresponding with a geometry of a separate layer of the structure to be formed, wherein each said step of said bed has a different height, and wherein a height differential between said steps of said bed is uniform and equal to a height of each layer of print material being printed by said printer.

2. The system of claim 1 wherein said printer is a screen printer with a screen containing said spaces.

3. The system of claim 1 wherein at least two of said alignment locations of said bed are spaced laterally from a third alignment location in two non-parallel directions from each other, such that said alignment locations are not arrayed linearly.

4. The system of claim 1 wherein said alignment locations include regions on a sloping surface of said bed facing said substrate blocks.

5. The system of claim 1 wherein said alignment locations include planar steps.

6. The system of claim 5 wherein said system includes a means for moving said substrate blocks between said steps.

7. The system of claim 6 wherein said bed includes a rectangular array of said steps arranged in multiple rows and columns, and wherein said substrate block moving means includes a shuffler adapted to slide all of said substrate blocks laterally a distance similar to a width of said substrate blocks, and a lifter adapted to grab a column of end substrate blocks most distant from said shuffler with one of said end substrate blocks removed with a completed structure and the remainder of said end substrate blocks replaced on an end of said bed adjacent said shuffler, but down one row from a previous row for each of said end substrate blocks.

8. The system of claim 6 wherein said moving means is adapted to move said substrate blocks in a pattern along a plurality of linear rows and linear columns of said steps in said bed with each moving cycle involving shifting along a common row to an adjacent column except that end substrate blocks at the end of each row in the direction of movement is moved to the opposite end of the bed and down one row, and with said end substrate block at an end of the last row being removed with a completed structure thereon, and with a new substrate block supplied at a first row of the bed ready to begin print-forming thereon.

9. The system of claim 6 wherein said moving means follows a pattern of substrate block movement which includes moving said substrate blocks upon a rectangular array of multiple columns and rows of steps with adjacent rows of substrate blocks moving in opposite directions, and with substrate blocks at the end of each row moving to an adjacent row within a common column, and with one substrate block in a last row having a completed structure thereon removed, and with one substrate block in a first row newly provided for beginning the print-forming process thereon.

10. The system of claim 9 wherein a curb is provided, said curb adapted to guide said substrate blocks at the ends of rows to an adjacent row within the same column without rotation.

11. The system of claim 9 wherein a curb is provided, said curb adapted to move said substrate blocks at the ends of rows to an adjacent row within the same column with a 90° rotation thereof.

12. The system of claim 9 wherein a curb is provided along with a rotating disk, said curb and rotating disk adapted to rotate said substrate blocks 180° while transitioning said substrate blocks to an adjacent row within the same column.

13. The system of claim 6 wherein said substrate block moving means follows a pattern which spirals between a perimeter of said bed and a center of said bed.

14. The system of claim 6 wherein said bed includes a plurality of said steps spaced along a line with said steps being progressively lower, said substrate block moving means adapted to follow a linear path from higher steps of said bed to lower steps of said bed.

15. The system of claim 14 wherein said bed includes at least two rows of said steps within a common column perpendicular to said rows being of similar height.

16. The system of claim 1 wherein said system further includes a plurality of substrate block holders each adapted to hold one of said substrate blocks precisely upon one of said alignment locations of said bed during printing by said printer.

17. The system of claim 16 wherein said substrate block holders include a source of vacuum within said bed with vacuum ports extending up through said alignment locations in said bed to hold said substrate blocks down upon said alignment locations of said bed in fixed position during printing.

18. The system of claim 17 wherein said substrate block holders include alignment structures upon said substrate blocks having a contour complemental with structures within said bed, such that said substrate blocks are precisely aligned upon said alignment locations of said bed when said source of vacuum applies a vacuum force drawing said substrate blocks down upon said bed.

19. The system of claim 18 wherein said alignment structures include alignment pins and alignment holes of complemental form in said substrate blocks and in said bed, with said pins received within said holes when said substrate blocks are properly aligned upon said bed.

20. The system of claim 16 wherein said plurality of substrate block holders include complemental magnetic structures between said substrate blocks and said alignment locations in said bed such that magnetic forces between the substrate blocks and said bed draw said substrate blocks to a precise position required upon said bed.

21. The system of claim 16 wherein said plurality of substrate block holders include mechanical clamps between the bed alignment locations and the substrate blocks, said clamps adapted to mechanically hold said substrate blocks precisely where required upon each alignment location of said bed.

22. The system of claim 1 wherein said substrate blocks include regular substrate blocks and starter substrate blocks, said starter substrate blocks having a greater height than said regular substrate blocks.

23. The system of claim 22 wherein said regular substrate blocks each have a common height.

24. The system of claim 22 wherein said starter substrate blocks each have a different height with a height differential equal to a height of each material print layer.

25. A system for high volume print-forming comprising in combination:
a bed having a plurality of alignment locations;
at least two of said alignment locations positioned at different heights relative to each other;
a plurality of substrate blocks, each substrate block including a substantially planar exposed surface and adapted to be positioned on one of said alignment locations of said bed and to move between said alignment locations while supporting upon said exposed surface a structure being print formed;
a printer located adjacent said exposed surfaces of said substrate blocks and adapted to print material down toward said substrate blocks and upon the structures being print formed upon said substrate blocks;
wherein said printer includes a plurality of print spaces overlying said alignment locations of said bed, said spaces adapted to print material in patterns corresponding with a geometry of different layers of a common structure to be formed;
wherein said printer is a screen printer with a screen containing said spaces; and
wherein said screen is sized at least as large as said bed, said alignment locations on said bed including steps, wherein a number of said spaces contained within said screen is equal to a number of said steps in said bed, wherein each said space on said screen has a pattern corresponding with a geometry of a separate layer of the structure to be formed, wherein each said step of said bed has a different height, and wherein a height differential between said steps of said bed is uniform and equal to a height of each layer of print material being printed by said printer.

26. The system of claim 25 wherein said screen printer includes a positive screen and a negative screen, said positive screen adapted to be used with positive ink material and said negative screen adapted to be used with negative ink material, said positive screen and said negative screen together providing a substantially complete layer for the structure to be formed, with later removal of the negative ink material from all of the layers resulting in the finished structure formed of the positive ink material.

27. The system of claim 26 wherein said screen printer includes a means to cure the materials deposited by said positive printing station and said negative printing station.

28. The system of claim 27 wherein a negative remover is provided downstream from said printer, said negative remover adapted to remove the negative ink material from the structure being formed after it moves away from said printer.

29. The system of claim 27 wherein a combined negative remover and debinder is provided downstream from said printer, said combined negative remover and debinder adapted to both remove the negative ink material and the binder within the positive ink material.

30. The system of claim 28 wherein said system includes a debinder downstream from said negative remover, said debinder adapted to remove a binder contained within the positive ink material applied by said printer, and wherein said machine includes a densifier downstream from said debinder, said densifier adapted to densify the positive ink material applied by said printer.

31. A high volume print-forming machine, comprising in combination:
a bed having a plurality of alignment locations;
at least three of said alignment locations positioned at different heights relative to each other;
at least two of said alignment locations spaced laterally from a third said alignment location in two non-parallel directions from each other, such that said alignment locations are not arrayed linearly;
a printer located above said bed and adapted to print material down toward said bed;
wherein said printer includes a plurality of print spaces overlying said alignment locations of said bed, said spaces adapted to print material in patterns corresponding with a geometry of different layers of a common structure to be formed; and
wherein said printer is sized at least as large as said bed, said alignment locations on said bed including steps, wherein a plurality of said spaces on said printer have patterns corresponding with a geometry of separate layers of the structure to be formed, wherein a plurality of said steps of said bed have different heights, and wherein a height differential between at least some of said steps of said bed is equal to a height of at least one layer of print material being printed by said printer.

32. The machine of claim 31 wherein said printer includes a plurality of print spaces overlying said alignment locations of said bed, said spaces adapted to print material in patterns corresponding with a geometry of different layers of a common structure to be formed.

33. The machine of claim 32 wherein said printer is a screen printer with a screen containing said spaces.

34. The machine of claim 33 wherein said screen is sized at least as large as said bed.

35. The machine of claim 33 wherein a number of said spaces contained within said screen is equal to a number of said alignment locations in said bed.

36. The machine of claim 33 wherein each said space on said screen has a pattern corresponding with a geometry of a separate layer of the structure to be formed, and wherein each said alignment location of said bed includes a step having a different height.

37. The machine of claim 36 wherein a height differential between said steps of said bed is uniform and equal to a height of each layer of print material being printed by said printer.

38. The machine of claim 33 wherein said screen printer includes a positive screen and a negative screen, said positive screen adapted to be used with positive ink material and said negative screen adapted to be used with negative ink material, said positive screen and said negative screen together providing a substantially complete layer for the structure to be formed, with later removal of the negative ink material from all of the layers resulting in the finished structure formed of the positive ink material.

39. The machine of claim 38 wherein said screen printer includes a means to cure the materials deposited by said positive printing station and said negative printing station.

40. The machine of claim 39 wherein a negative remover is provided downstream from said printer, said negative remover adapted to remove the negative ink material from the structure being formed after it moves away from said printer.

41. The machine of claim 40 wherein said negative remover is also adapted to remove a binder contained within the positive ink material.

42. The machine of claim 40 wherein said negative remover is adapted to remove the negative ink material through a process taken from the group of negative removal processes including heating, liquid washing, evaporation, chemical dissolving, and ultrasonic cleansing.

43. The machine of claim 40 wherein said machine includes a debinder downstream from said negative remover, said debinder adapted to remove a binder contained within the positive ink material applied by said printer.

44. The machine of claim 43 wherein said debinder is adapted to remove said binder through a process taken from the group of debinder processes including heating, liquid washing, evaporation, chemical dissolving, and ultrasonic cleansing.

45. The machine of claim 43 wherein said machine includes a densifier downstream from said debinder, said densifier adapted to densify the positive ink material applied by said printer.

46. The machine of claim 45 wherein said densifier is adapted to densify the positive ink material forming the structure being formed through a process taken from the group of densifier processes including heating, liquid washing, evaporation, chemical dissolving, ultrasonic cleansing, isostatic pressing and heating in atmospheres of special fluids in a vacuum.

47. The machine of claim 31 wherein a plurality of substrate blocks are provided with each substrate block adapted to be positioned on one of said alignment locations of said bed and to move between said alignment locations while supporting a structure being print formed thereon.

48. The machine of claim 47 wherein said machine further includes a plurality of substrate block holders each adapted to hold one of said substrate blocks precisely upon one of said alignment locations of said bed during printing by said printer.

49. The machine of claim 48 wherein said substrate block holders include a source of vacuum within said bed with vacuum ports extending up through said alignment locations in said bed to hold said substrate blocks down upon said alignment locations of said bed in fixed position during printing.

50. The machine of claim 49 wherein said substrate block holders include alignment structures upon said substrate blocks having a contour complemental with structures within said bed, such that said substrate blocks are precisely aligned upon said alignment locations of said bed when said source of vacuum applies a vacuum force drawing said substrate blocks down upon said bed.

51. The machine of claim 50 wherein said alignment structures include alignment pins and alignment holes of complemental form in said substrate blocks and in said bed, with said pins received within said holes when said substrate blocks are properly aligned upon said bed.

52. The machine of claim 47 wherein said machine includes a means for moving said substrate blocks between said alignment locations.

53. The machine of claim 52 wherein said alignment locations of said bed include a rectangular array of said steps arranged in multiple rows and columns, and wherein said substrate block moving means includes a shuffler blade adapted to slide all of said substrate blocks laterally a distance similar to a width of said substrate blocks, and a spatula adapted to grab a column end of substrate blocks most distant from said shuffler blade with one of said end substrate blocks removed with a completed structure and the remainder of said end substrate blocks replaced on an end of said bed adjacent said shuffler blade, but down one row from a previous row for each of said end substrate blocks.

* * * * *